(12) United States Patent
Ikenohata

(10) Patent No.: US 9,956,936 B2
(45) Date of Patent: May 1, 2018

(54) CURTAIN AIRBAG

(71) Applicant: TOYODA GOSEI CO., LTD., Kiyosu-shi, Aichi-ken (JP)

(72) Inventor: Sho Ikenohata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days. days.

(21) Appl. No.: 15/629,095

(22) Filed: Jun. 21, 2017

(65) Prior Publication Data

US 2017/0369024 A1 Dec. 28, 2017

(30) Foreign Application Priority Data

Jun. 23, 2016 (JP) ................................ 2016-125016

(51) Int. Cl.
```
B60R 21/16      (2006.01)
B60R 21/232     (2011.01)
B60R 21/2338    (2011.01)
B60R 21/231     (2011.01)
B60R 21/21      (2011.01)
```

(52) U.S. Cl.
CPC ............ *B60R 21/232* (2013.01); *B60R 21/21* (2013.01); *B60R 21/2338* (2013.01); *B60R 21/23138* (2013.01); *B60R 2021/23386* (2013.01)

(58) Field of Classification Search
USPC ................................ 280/730.1, 743.1, 743.2
See application file for complete search history.

(56) References Cited

U.S. PATENT DOCUMENTS

| 9,027,954 | B2* | 5/2015 | Konishi | B60R 21/213 |
| | | | | 280/728.2 |
| 9,505,371 | B2* | 11/2016 | Kawamura | B60R 21/2334 |
| 9,610,916 | B2* | 4/2017 | Kawamura | B60R 21/232 |
| 2010/0225097 | A1* | 9/2010 | Trovato | B60R 21/232 |
| | | | | 280/730.2 |
| 2014/0217707 | A1* | 8/2014 | Konishi | B60R 21/213 |
| | | | | 280/728.2 |
| 2014/0239619 | A1* | 8/2014 | Fukawatase | B60R 21/232 |
| | | | | 280/730.2 |
| 2015/0151708 | A1* | 6/2015 | Kawamura | B60R 21/232 |
| | | | | 280/728.2 |

(Continued)

FOREIGN PATENT DOCUMENTS

| JP | 2008-006895 A | 1/2008 |
| JP | 2013-052748 A | 3/2013 |

*Primary Examiner* — Toan To
(74) *Attorney, Agent, or Firm* — Posz Law Group, PLC

(57) ABSTRACT

A curtain airbag includes: an airbag body of which an upper periphery is fixedly mounted on a body side of the vehicle to be deployable downward to cover an inboard side of the window when an inflation gas flows in; and a connection belt connecting the window and the airbag body, wherein: the connection belt is arranged so as to cover a portion of an end periphery of the airbag body in the front and rear direction and an inflatable portion of the airbag body on an outboard side wall side of the airbag body in a proper arrangement state; and a mark for checking the proper arrangement state of the connection belt is arranged to be visually recognized from at least the outboard side wall side in a vicinity of each of an upper periphery and a lower periphery of the connection belt in the proper arrangement state.

8 Claims, 21 Drawing Sheets

(56) References Cited

U.S. PATENT DOCUMENTS

| | | | | |
|---|---|---|---|---|
| 2015/0191141 A1* | 7/2015 | Wang | ............... | B60R 21/232 |
| | | | | 280/730.2 |
| 2015/0360637 A1* | 12/2015 | Sitko | ............... | B60R 21/213 |
| | | | | 280/730.2 |
| 2016/0009245 A1* | 1/2016 | Steinbrecher | ......... | B60R 21/237 |
| | | | | 280/730.2 |
| 2016/0221527 A1* | 8/2016 | Sugimori | ............. | B60R 21/232 |

* cited by examiner

V-V SECTIONAL VIEW

VI-VI SECTIONAL VIEW

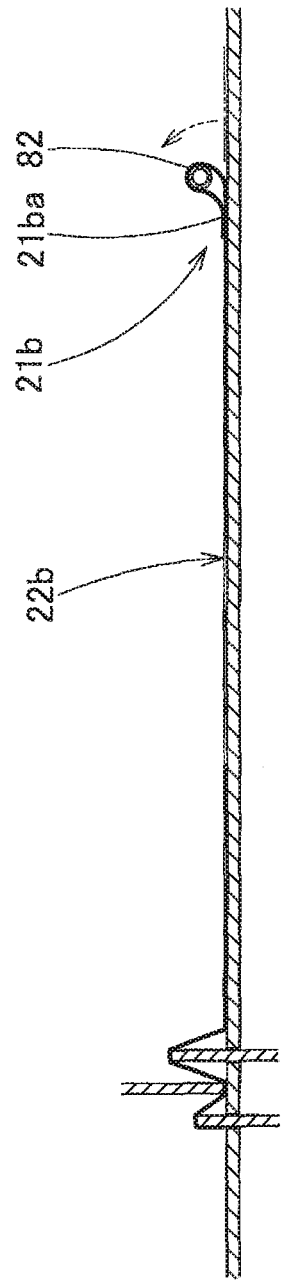
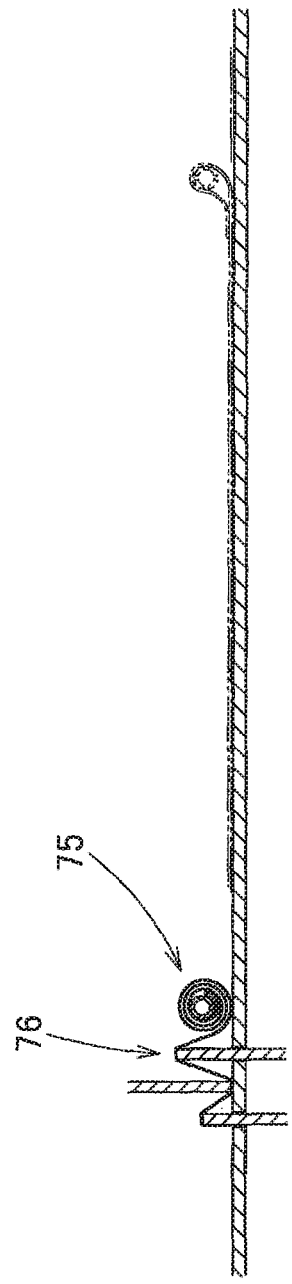
FIG. 10A
FIG. 10B

CURTAIN AIRBAG

CROSS-REFERENCE TO RELATED APPLICATION(S)

This application is based upon and claims the benefit of priority from Japanese Patent Application No. 2016-125016, filed on Jun. 23, 2016, the entire contents of which are incorporated herein by reference.

BACKGROUND

1. Field of the Invention

The present invention relates to a curtain airbag which is configured to be accommodated in a folded state on an upper peripheral side of a window on an inboard side of a vehicle and to be used to cover an inboard side of the window by being deployed downward when an inflation gas flows in.

2. Description of the Related Art

In the past, such a type of curtain airbag includes an airbag body and a connection belt (for example, see JP-A-2008-006895). The airbag body is accommodated in a folded state on an upper peripheral side of a window on an inboard side of a vehicle, and an upper periphery is fixedly mounted on a body side of the vehicle such that the airbag body can be deployed downward to cover the inboard side of the window when an inflation gas flows in. The connection belt is disposed in the front end of the airbag body substantially along a front and rear direction such that a tension can be generated in the airbag body at the time of completion of inflation along the front and rear direction. A tip is connected with a front pillar on the peripheral side of the window in the front and rear direction, and a base portion is connected with the airbag body.

In an outboard side wall of the airbag body, the connection belt extends from the tip substantially along the front and rear direction and passes over an end periphery of the airbag body, and the base portion is connected with the airbag body to cross an inflatable portion of the airbag body. For this reason, when the curtain airbag is completely inflated, the connection belt presses a vehicle side wall of the inflatable portion on the front end side of the airbag body to an indoor side. Thus, an advancing occupant such as a driver can be protected by being caught by the inflatable portion which is extruded to the inboard side on the front end side of the airbag body.

In another curtain airbag, the connection belt is disposed such that the connection belt passes through the loop, which is mounted in the outboard side wall on the front end side of the airbag body (for example, see JP-A-2013-052748).

When such a type of curtain airbag is accommodated in the folded state on the upper peripheral side of the window, the curtain airbag is folded such that a lower periphery of the airbag body approaches to the upper periphery. However, the folding is performed normally by an outside roll-folding which winds the lower periphery of the airbag body toward the outboard side wall such that the airbag body can be deployed to approach to the window on the inboard side at the time of deployment. At the time of folding, in the connection belt, when the tip extending forward from the base portion connected with the airbag body is inclined upward or downward from a proper arrangement position, and the connection belt is folded integrally with the airbag body, a protruding length of the tip of the connection belt from the airbag body becomes short. Thus, the folded airbag is hardly mounted in the vehicle, or the airbag body hardly secures a stable inflation behavior since the connection belt hinders the release of the folding of the airbag body when the inflation gas flows in. Therefore, an operation to arrange the connection belt before folding in the proper arrangement position, and further a proper arrangement confirming operation in the middle of the roll-folding are performed carefully. For this reason, the conventional curtain airbag has room for improvement in terms that the folding operation is performed efficiently and smoothly.

As described in JP-A-2013-052748, in the configuration in which the connection belt passes through the loop provided in the airbag body, the loop performs a vertical position regulation of the connection belt, so that the above-described problem hardly occurs. However, in such an airbag, it is necessary to be provided a loop and further, as a folding preparing operation to allow the connection belt to pass through the loop, and thus the number of the operations increases. In addition, in the airbag, at the time of completion of inflation, the connection belt which causes the tension becomes in a state of pulling out the front end of the inflatable portion of the airbag body as the arrangement portion of the loop to the outboard side. Thus, an effect that extrudes the inflatable portion on the front end side of the airbag to the inboard side is suppressed, and a function of the connection belt is hindered.

SUMMARY

An object of the present invention is to provide a curtain airbag which performs a folding operation efficiently and smoothly while a function of a connection belt is not hindered.

According to an aspect of the present invention, there is provided a curtain airbag including: an airbag body which is accommodated in a folded state on an upper peripheral side of a window on an inboard side of a vehicle, and of which an upper periphery is fixedly mounted on a body side of the vehicle to be deployable downward to cover an inboard side of the window when an inflation gas flows and a connection belt which is disposed in an end of the airbag body in a front and rear direction such that a tension is generated in the airbag body at a time of completion of inflation along the front and rear direction, and has a tip connected with a pillar on a peripheral side of the window in the front and rear direction and a base portion connected with the airbag body, wherein: the connection belt extending from the tip to the base portion as a connection portion connected with the airbag body is configured to be arranged substantially along the front and rear direction so as to cover a portion of an end periphery of the airbag body in the front and rear direction and an inflatable portion of the airbag body on an outboard side wall side of the airbag body in a proper arrangement state of being flatly deployed together with the airbag body before folding; and a mark for checking the proper arrangement state of the connection belt is arranged to be visually recognized from at least the outboard side wall side in a vicinity of each of an upper periphery and a lower periphery of the connection belt in the proper arrangement state in the airbag body in the state of being flatly deployed before folding.

In the curtain airbag according to the present invention, when the connection belt is flatly deployed together with the airbag body before folding, the mark can be visually recognized simultaneously in the vicinity of the upper periphery and the lower periphery of the connection belt, it can be checked that the connection belt is in the proper arrangement state. Thereafter, when the outside roll-folding is in progress, or when the connection belt is folded integrally with the airbag body, if the mark can be visually recognized together in the vicinity of the upper periphery and the lower periphery of the connection belt, it can be checked that the airbag body is folded in a state where the connection belt is in the proper arrangement state.

That is, in the curtain airbag according to the present invention, merely by visually recognizing the mark in the vicinity of the upper periphery and the lower periphery of the connection belt, the proper arrangement state of the connection belt can be checked before folding or in the middle of folding, and the folding operation can be performed efficiently and smoothly. Of course, if the mark cannot be recognized visually, the operation is suspended, and the arrangement of the connection belt is corrected to the proper arrangement such that the mark can be recognized visually. Thereafter, the operation may start again, and the folding operation can be performed efficiently and smoothly.

The mark may be arranged merely to be visually recognized at least the vehicle side wall of the airbag body, and can be disposed to be separated from the connection belt. Thus, the function of the connection belt is not hindered which allows the inflatable portion on the end peripheral side of the airbag body at the time of completion of inflation to be extruded toward the indoor side.

Therefore, in the curtain airbag according to the present invention, the folding operation can be performed efficiently and smoothly while the function of the connection belt is not hindered.

According to the curtain airbag of the present invention, the mark may be provided by cutting the airbag body, or by coloring to maintain a state of being substantially flush with a surface of the outboard side wall.

With such a configuration, the mark can be arranged without hindering the flexibility of the airbag body merely by providing a predetermined notch at the time of cutting the airbag material, by weaving a predetermined colored thread when the airbag material is woven, or by applying a predetermined color when a coating agent is applied. Of course, the mark can be formed by notching or by coloring, and does not protrude from the outboard side wall of the airbag body, that is, the mark is formed such that the thickness of the airbag body is not increased. Thus, it can be prevented that the volume of the folded curtain airbag is increased.

According to the curtain airbag of the present invention, upper mark on an upper peripheral side of the connection belt and a lower mark on a lower peripheral side of the connection belt in the mark may be arranged to be separated by a dimension of an acceptable arrangement difference from the upper periphery and the lower periphery of the connection belt in the proper arrangement state.

With such a configuration, if the connection belt is simply arranged between the upper mark and the lower mark, it can be checked by an instant visual observation whether the connection belt is in the proper arrangement state within an acceptable error range, and thus the folding operation can be performed further efficiently and smoothly.

According to the curtain airbag of the present invention, a concave portion which is concave along the front and rear direction may be formed in the end periphery of the airbag body which is covered by the connection belt in the proper arrangement state, and upper and lower crossing portions between the end periphery and the peripheral edge of the concave portion may configure the mark.

In such a mark, the upper and lower crossing portions, which are crossed with the end periphery, of the peripheral edge of the concave portion in the airbag body, that is, the upper corner and the lower corner of the peripheral edge of the concave portion configure the upper mark and the lower mark in the mark. It can be instantaneously checked whether the connection belt is in the proper arrangement state by checking an existence of a gap between the upper periphery of the connection belt and the upper corner of the upper mark, or an existence of a gap between the lower peripheries of the connection belt and the lower corner of the lower mark, and thus the folding operation can be performed efficiently and smoothly.

According to the curtain airbag of the present invention, in the connection belt: a length dimension between both upper and lower ends of the connection portion, which is connected with the airbag body, of the base portion may be larger than a vertical width dimension of a portion which covers the end periphery of the airbag body; a width dimension between the upper periphery and the lower periphery may be gradually enlarged toward the base portion; and the connection portion, which is connected with the airbag body, of the connection belt may be disposed to have almost the same separation distance from another connection portion, which is connected with a peripheral side of the window, of the tip of the connection belt to the respective upper and lower ends of the connection portion connected with the airbag body, and may be disposed not to have a portion connected with the airbag body with a shorter separation distance than the separation distance from the tip of the both upper and lower ends.

With such a configuration, in the connection portion, which is connected with the airbag body, of the connection belt, the both upper and lower ends have the same separation distance from the tip connected with the peripheral edge of the window, or another connection portion is not connected with the airbag body in a portion which has a shorter distance than separation distance from the tip. Thus, at the time of completion of inflation of the airbag body, the tension is generated on lines in which each of two connection positions of the both upper and lower ends of the connection portion, which is connected with the airbag body, of the base portion in the connection belt is connected with the connection portion of the tip. For this reason, the tension can be generated in a vertically wide area of the base portion of the connection belt. The inflatable portion supported by such a connection belt on the end peripheral side of the airbag body is extruded to the indoor side while the outboard side wall is supported stably. Thus, the head of the occupant which moves obliquely forward (outboard side) or obliquely rearward can be protected accurately by the inflatable portion on the end peripheral side.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 10A and 10B are views illustrating the folding process of the curtain airbag of the embodiment in order, and illustrate a state after the process of FIGS. 9A to 9C;

DETAILED DESCRIPTION OF THE INVENTION

Figure 1:
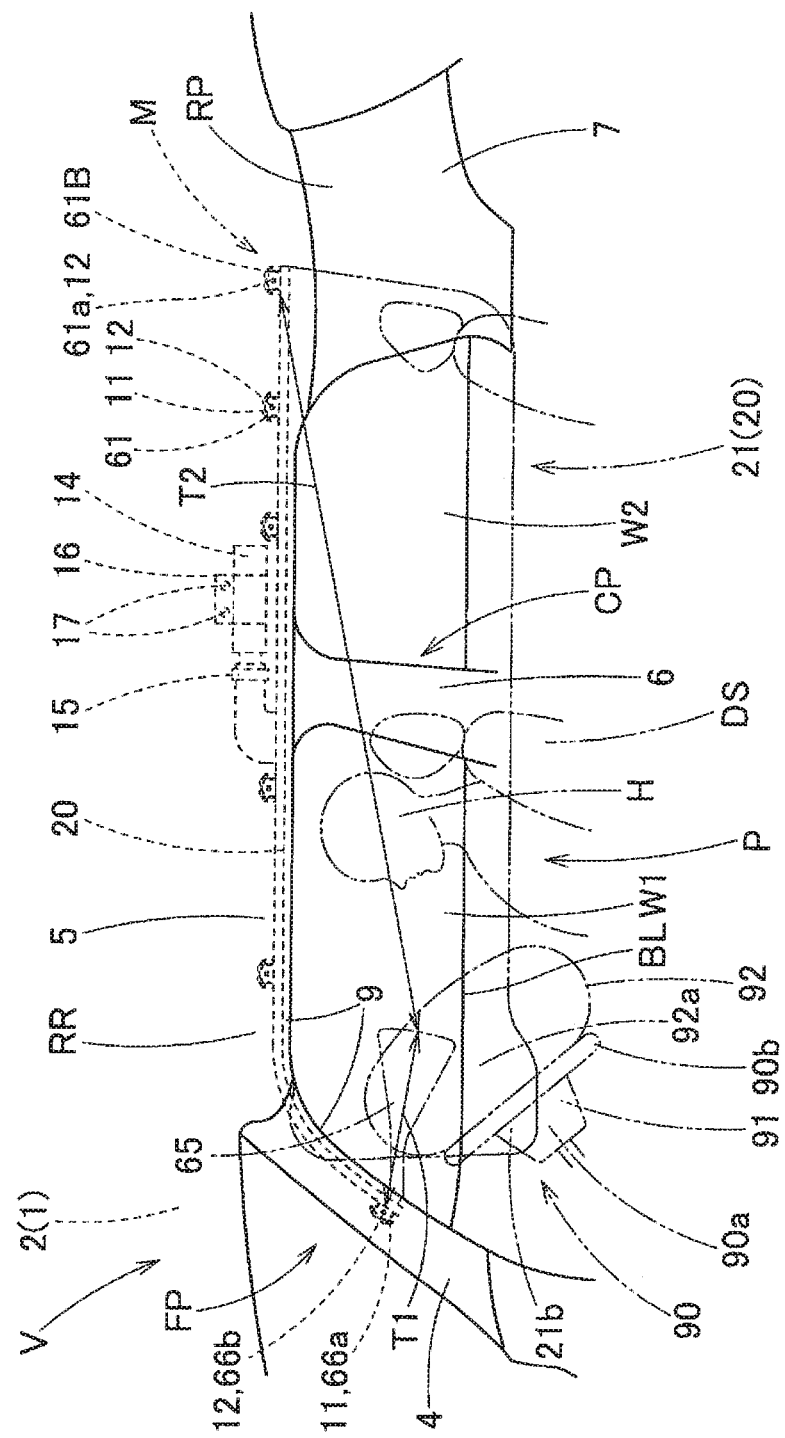
FIG. 1 is a schematic front view when a head-protecting airbag device using a curtain airbag as one embodiment of the present invention is viewed from an inboard side.

Hereinafter, one embodiment of the present invention will be described based on the drawings, and as illustrated in FIG. 1, a curtain airbag (hereinafter, appropriately, referred to as an airbag) 20 of the embodiment is used for the head-protecting airbag device M. As illustrated in FIG. 1, the head-protecting airbag device M is mounted to a two-row seat type vehicle V having two windows (side windows) W1 and W2. Further, in the drawings, the airbag device M is mounted on an upper peripheral side of the windows W1 and W2 on the right side (outboard side) of a driver seat DS in a right-handle vehicle.

The head-protecting airbag device M includes an airbag 20, an inflator 14, mounting brackets 11 and 16, and an airbag cover 9. The airbag 20 is accommodated in a folded state on the upper peripheral side of the windows W1 and W2 on the inboard side of the vehicle V from the lower periphery of a front pillar FP to the upper area of a rear pillar RP through the lower periphery of a roof side rail RR.

The airbag cover 9 is configured from respective lower peripheries of a front pillar garnish 4 arranged in the front pillar FP and a roof head lining 5 arranged in the roof side rail RR. The front pillar garnish 4 and the roof head lining 5 are made of synthetic resin, and are fixedly mounted on the inboard side I of an inner panel 2 of a body 1 (vehicle body) in the front pillar FP and the roof side rail RR, respectively (see two-dot chain lines of FIGS. 14 and 15). In addition, the airbag cover 9 covers the inboard side I of the airbag 20 accommodated in the folded state, and is configured to be openable to the inboard side I by being pressed by the airbag 20 in order that the airbag 20 can protrude downward on the inboard side at the time of deployment solid lines of FIGS. 14 and 15).

The inflator 14 supplies an inflation gas to the airbag 20, and is a substantially columnar cylinder type. A gas discharge outlet (not illustrated) through which the inflation gas can be discharged is disposed in the tip. In the inflator 14, the tip including the vicinity of the gas discharge outlet is inserted into a connection opening 26 (to be described later) of the airbag 20, and is connected with the airbag 20 by using a clamp 15 which is arranged in the outer circumference of the connection opening 26. In addition, the inflator 14 is mounted in a position which is above the window W2 of the inner panel 2 by using a mounting bracket 16 holding the inflator 14, and a bolt 17 for fixing the mounting bracket 16 in the inner panel 2 of the body 1. The inflator 14 is electronically connected to a control device (not illustrated) of the vehicle V through a lead wire (not illustrated). The inflator 14 is configured to be operated by inputting an operation signal sent from the control device when the control device detects a side collision, an oblique collision, or a rollover of the vehicle V, and the like.

Each of the mounting brackets 11 is configured by two sheet metal plates. The mounting brackets 11 nip respective mounting portions 61 and 66a (to be described later) of the airbag 20 from front and back sides, and are mounted in the respective mounting portions 61 and 66a. The mounting portions 61 and 66a are fixedly mounted in the inner panel 2 of the body 1 by using a bolt 12 (see FIG. 14).

As illustrated in FIGS. 2 to 4, 14, and 15, the airbag 20 includes an airbag body 21 and a connection belt 65 which extends from one end (the front end in the embodiment) of the airbag body 21 in the front and rear direction and of which a tip 65a is fixed in the inner panel 2 of the body 1.

Figure 14:
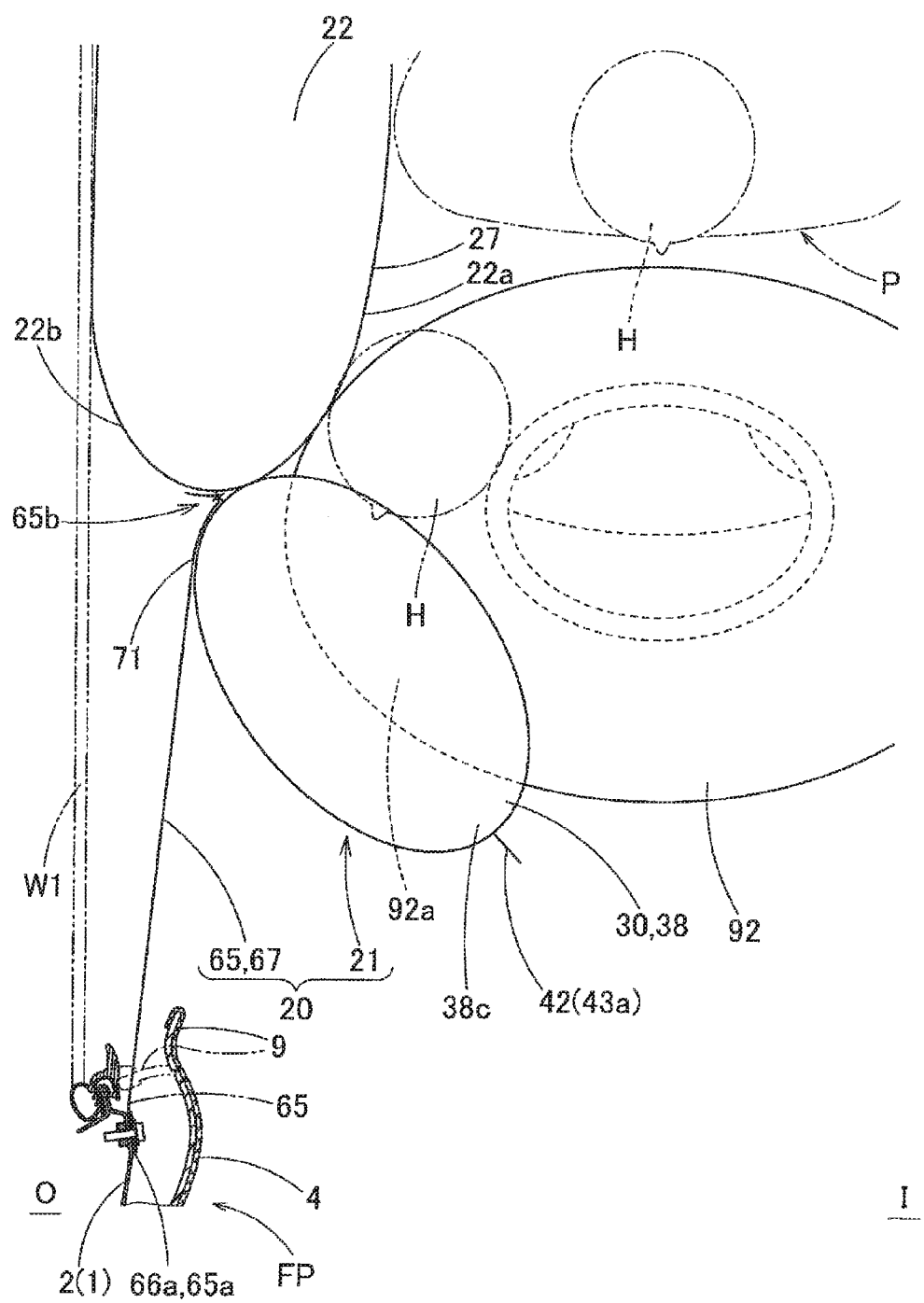
FIG. 14 is a schematic partially-enlarged lateral sectional view in a front and rear direction illustrating a state where the curtain airbag of the embodiment is completely inflated in a vehicle-mounted state.
Figure 15:
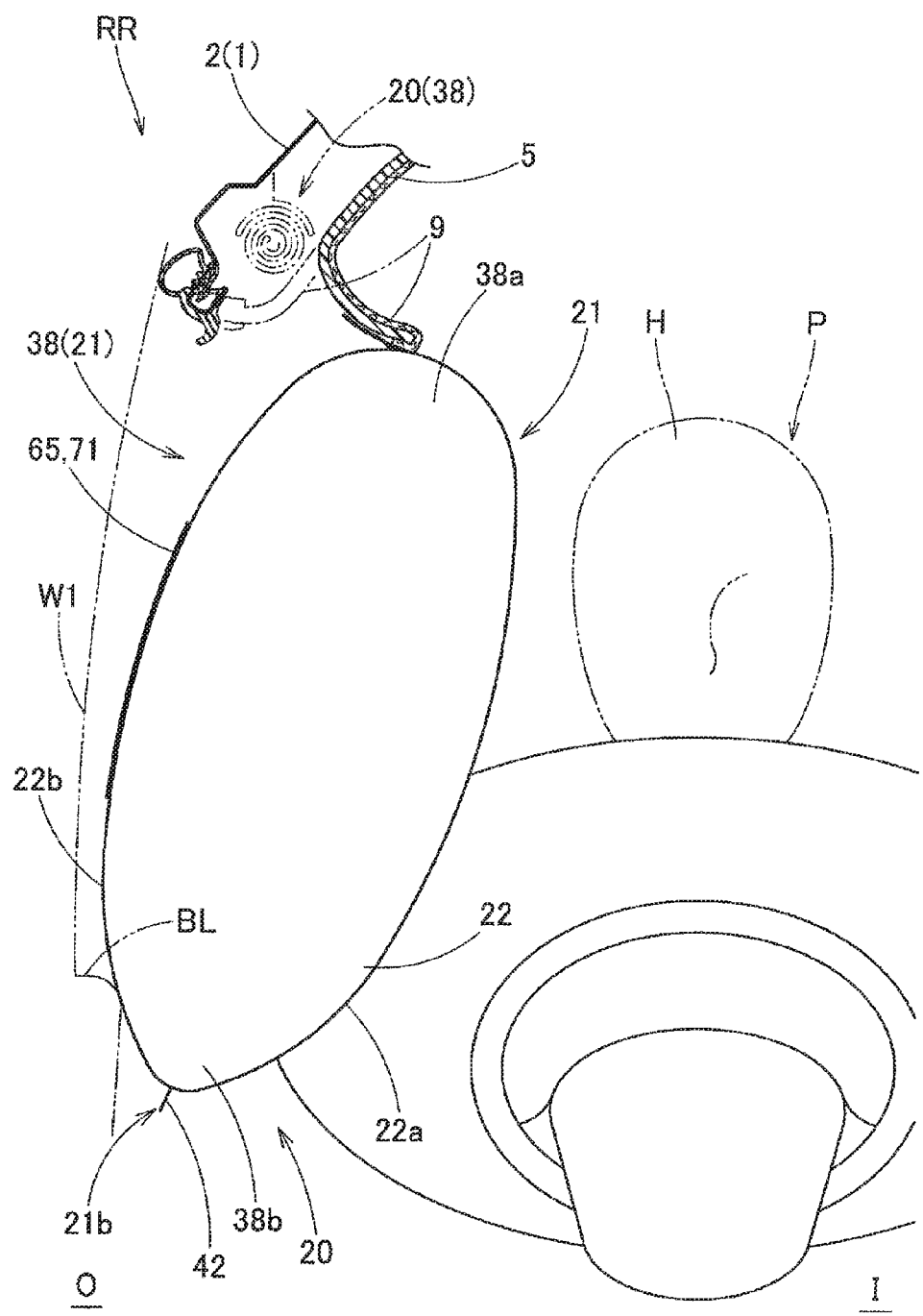
FIG. 15 is a schematic partially-enlarged vertical sectional view vertically illustrating a state where the curtain airbag of the embodiment is completely inflated in the vehicle-mounted state.

As illustrated in FIGS. 1 to 4, 14, and 15, the airbag body 21 is configured to be deployed from the folded state so as to cover the inboard side I of the windows W1 and W2, or pillar garnishes 6 and 7 of a center pillar CP and the rear pillar RP when the inflation gas from the inflator 14 is allowed to flow in. The outer shape of the airbag body is formed in a substantially rectangular plate shape in which a longitudinal direction is substantially along the front and rear direction, so as to cover the inboard side from the window W1 to the front side of the rear pillar RP through the center pillar CP and the window W2 at the time of completion of inflation. In addition, in the case of the embodiment, as illustrated in FIGS. 1 and 15, the airbag body 21 is set to have such a vertical width dimension that the lower periphery 21b at the time of completion of inflation is positioned below a belt line BL configured from the lower periphery of the windows W1 and W2.

Figure 2:
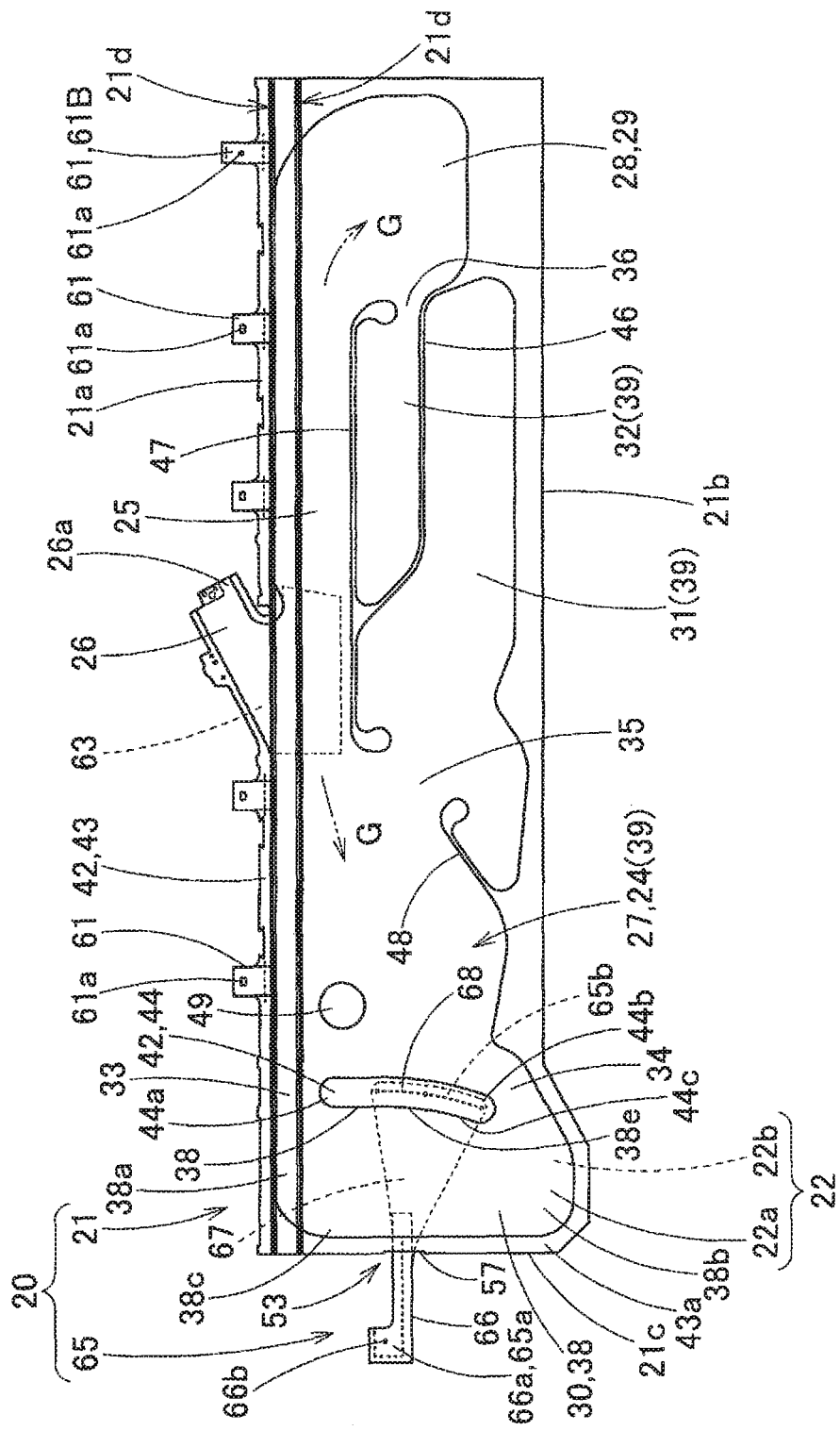
FIG. 2 is a front view illustrating a state where the curtain airbag of embodiment is flatly deployed.

In the case of the embodiment, the airbag body 21 is produced by double-weaving using polyamide yarn, polyester yarn, or the like. As illustrated in FIGS. 2, 14, and 15, the airbag body 21 has an inflatable portion (gas admissive portion) 22 which allows the inflation gas to flow in so as to be inflated, so that an inboard side wall 22a positioned on the inboard side I and an outboard side wall 22b positioned on the outboard side O are separated at the time of completion of inflation, and a non-inflatable portion 42 (closed portion) which is formed by coupling the inboard side wall 22a and the outboard side wall 22b so as not to allow the inflation gas to flow inside.

In the case of the embodiment, in order to protect the head of the occupant at the time of the rollover of the vehicle V, the inflatable portion 22 includes a main inflatable portion 24 (first inflatable portion) which allows the inflation gas discharged from the inflator 14 to flow in to be inflated, and a front sub inflatable portion 30, a central sub inflatable portion 31, and a rear sub inflatable portion 32 (second inflatable portion) which communicate with the main inflatable portion 24 and are completely inflated after the complete inflation of the main inflatable portion 24. The inflatable portion 22 includes communicating portions 33, 34, 35, and 36 which allow the main inflatable portion 24 to communicate with the front sub inflatable portion 30, the central sub inflatable portion 31, and the rear sub inflatable portion 32. Further, in the case of the embodiment, as illustrated in FIG. 2, the airbag body 21 is configured to be inflated by allowing the inflation gas G to flow in the almost entire surface excluding a slight area of an end partition portion 44 and a general partition portions 46, 47, and 48 (to be described later), which partition the main inflatable portion 24, the front sub inflatable portion 30, the central sub inflatable portion 31, and the rear sub inflatable portion 32, and a thickness regulating portion 49.

The main inflatable portion 24 includes a gas guidance path 25, the connection opening 26, a front-seat protecting portion 27, and a rear-seat protecting portion 28.

The gas guidance path 25 is disposed in an upper periphery 21a of the airbag body 21 over the almost entire area on the front and rear sides of the main inflatable portion 24 so as to extend substantially along the front and rear direction. The gas guidance path 25 is configured to guide the inflation gas G discharged from the inflator 14 to the front-seat protecting portion 27 and the rear-seat protecting portion 28 arranged below the gas guidance path 25. The connection opening 26 connected with the inflator 14 is disposed in a position (a position which is an almost center of the airbag body 21 in the front and rear direction) deviated slightly forward from the center of the gas guidance path 25 in the front and rear direction so as to communicate with the gas guidance path 25 and to protrude upward from the gas guidance path 25. The connection opening 26 is formed to be inclined rearward and upward with respect to the gas guidance path 25. A rear end 26a is opened such that the inflator 14 can be inserted therethrough. Further, the connection opening 26 is connected to the inflator 14 when the clamp 15 is fitted to the outer circumference thereof in a state where the inflator 14 is inserted thereinto. Incidentally, in the airbag 20 of the embodiment, an inner tube 56 for improving a thermal resistance is disposed from the connection opening 26 to the inner circumferential portion of the gas guidance path 25 directly below the connection opening 26.

In the case of the embodiment, in the completely folded body 74 (see FIGS. 7A to 7C) formed by folding the airbag 20, the vicinity of the gas guidance path 25 is a position where a bellow-folded portion 76 folded in a bellow manner is formed. A plurality of weaving yarns (warp) 21d (see FIGS. 2 and 3) colored in red and the like are woven so that bellow-folding creases 76a and 76b can be checked.

The front-seat protecting portion 27 is arranged on the front side of a front seat (driver seat DS) at the time of completion of inflation and is a portion for protecting the head H of the occupant P (driver) seated on the front seat (driver seat DS) when the airbag 20 is completely inflated at the time of the side collision. The rear-seat protecting portion 28 is arranged on the side of the rear seat at the time of completion of inflation, and is a portion for protecting the head of the occupant seated on the rear seat when the airbag 20 is completely inflated at the time of the side collision.

The front sub inflatable portion 30 is arranged on the front end 21c side of the airbag body 21 to be adjacent to the front side of the main inflatable portion 24 (front-seat protecting portion 27). In the airbag body 21 of the embodiment, the front sub inflatable portion 30 is an inflatable portion on the end periphery (front end) 21c side of the airbag body 21. The outboard side O of the front sub inflatable portion 30 is supported by the connection belt 65, and the front sub inflatable portion 30 configures an end inflatable portion 38 being extruded to the inboard side (indoor side) I (see FIG. 14). In the case of the embodiment, the complete inflation shape of the front sub inflatable portion 30 is a substantially stick shape substantially along a vertical direction. The front sub inflatable portion 30 is partitioned from the front-seat protecting portion 27 adjacent to the rear side by the end partition portion 44 (closed portion) (to be described later). In the case of the embodiment, the front sub inflatable portion 30 extends downward from the belt line BL at the time of completion of inflation and is configured such that a lower end 38b is positioned below the front-seat protecting portion 27. In addition, the front sub inflatable portion 30 communicates with the front-seat protecting portion 27 through a communicating portion 33 open to the rear upper end side and a communicating portion 34 open to the rear lower end side. Such communicating portions 33 and 34 are set such that an opening width dimension is small, and are configured such that the inflation gas starts to flow in the front sub inflatable portion 30 later than the front-seat protecting portion 27.

In the case of the embodiment, the central sub inflatable portion 31 is on the rear side of the front-seat protecting portion 27 in the main inflatable portion 24, and is arranged to be adjacent to the front-seat protecting portion 27 of the main inflatable portion 24 so as to be arranged in the lower area of the gas guidance path 25. In the case of the embodiment the central sub inflatable portion 31 communicates with the front-seat protecting portion 27 through a communicating portion 35 open to the rear end side of the front-seat protecting portion 27. The communicating portion 35 also is set such that an opening width dimension is small, and is configured such that the inflation gas starts to flow in the central sub inflatable portion 31 later than the front-seat protecting portion 27.

The rear sub inflatable portion 32 is arranged to bury the lower area of the gas guidance path 25 between the central sub inflatable portion 31 and the rear-seat protecting portion 28, and is arranged to be adjacent to the rear-seat protecting portion 28 in the main inflatable portion 24. The rear sub inflatable portion 32 communicates with the rear-seat protecting portion 28 through the communicating portion 36 open to the front end side of the rear-seat protecting portion 28. The communicating portion 36 also is set such that an opening width dimension is small, and is configured such that the inflation gas starts to flow in the rear sub inflatable portion 32 later than the rear-seat protecting portion 28.

In the airbag body 21 of the embodiment, as described above, the front sub inflatable portion 30 configures the end inflatable portion 38 which is arranged on the front end (end periphery) 21c side of the airbag body 21, and a portion of the inflatable portion 22 except the end inflatable portion 38 configures a general inflatable portion 39. The end inflatable portion 38 is partitioned from the front-seat protecting portion 27 configuring the general inflatable portion 39 by the end partition portion 44. The end partition portion 44 is separated from a peripheral edge 43 and is configured to have a stick shape which is curved in a substantially arc shape substantially along the vertical direction such that the vertically central side is positioned to the rear side. In the end inflatable portion 38, an upper end 38a and the lower end 38b communicate with the front-seat protecting portion 27 through the communicating portions 33 and 34. In addition, the end inflatable portion 38 is configured to be extruded by the connection belt 65 to the inboard side at the time of completion of inflation such that the upper end 38a is arranged on the inboard side I of the front pillar FP which is arranged on the front peripheral side of the window W1 to be inclined rearward and upward with respect to the vertical direction (see a two-dot chain line of FIG. 1). Further, at the time of completion of inflation of the airbag 20, as described above, the end inflatable portion 38 is arranged such that the lower end 38h protrudes downward from the belt line BL (see FIG. 15). Further, the end inflatable portion 38 is inflated to be overlapped with a steering wheel airbag 92 in the right and left direction (vehicle width direction) in a state where the steering wheel airbag 92 mounted in a steering wheel 90 on the front side of the driver seat DS is inflated completely (see FIGS. 1, 14, and 15).

In the embodiment, the end partition portion 44 which partitions the end inflatable portion 38 (front sub inflatable portion 30) and the general inflatable portion 39 (front-seat protecting portion 27) is formed to be curved in a substantially arc shape such that the vertically central side protrudes rearward. A connection portion 68, which is connected to the end partition portion 44, of the base portion 65b of the connection belt 65 is also formed to be curved along the end partition portion 44 (see FIG. 3).

The non-inflatable portion 42 as the closed portion includes the peripheral edge 43 configuring the outer periphery of the inflatable portion 22, the end partition portion 44 and the general partition portions 46, 47, and 48 which are arranged in the area of the inflatable portion 22, the thickness regulating portion 49, and a mounting portion 61 for mounting the upper periphery 21a of the airbag body 21 in the body 1 of the vehicle V.

The peripheral edge 43 is arranged to surround the entire circumference of the inflatable portion 22 except the rear end 26a side of the connection opening 26.

Figure 3:
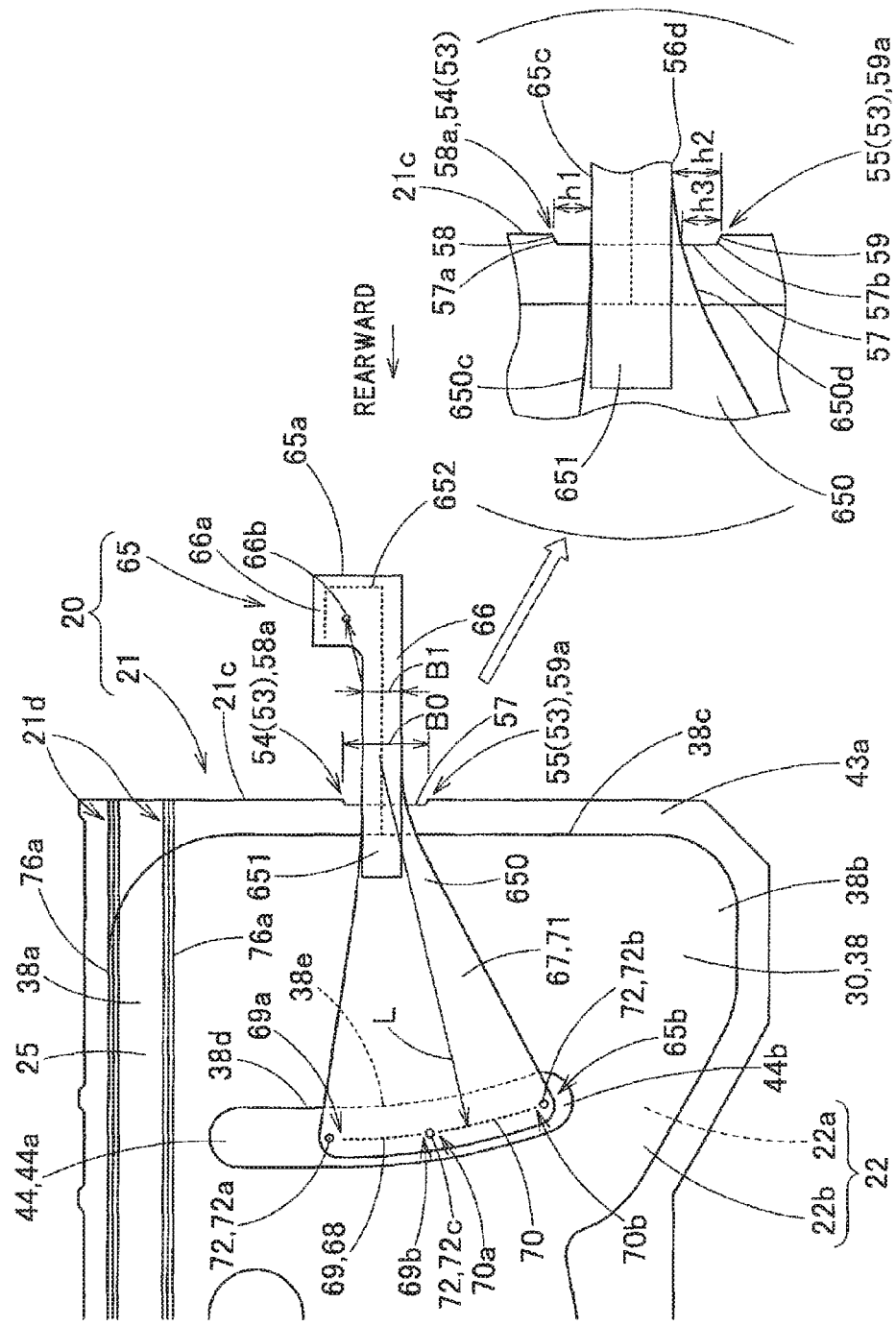
FIG. 3 is a partially enlarged back view of a vicinity of a mark of the curtain airbag of the embodiment.
Figure 4:
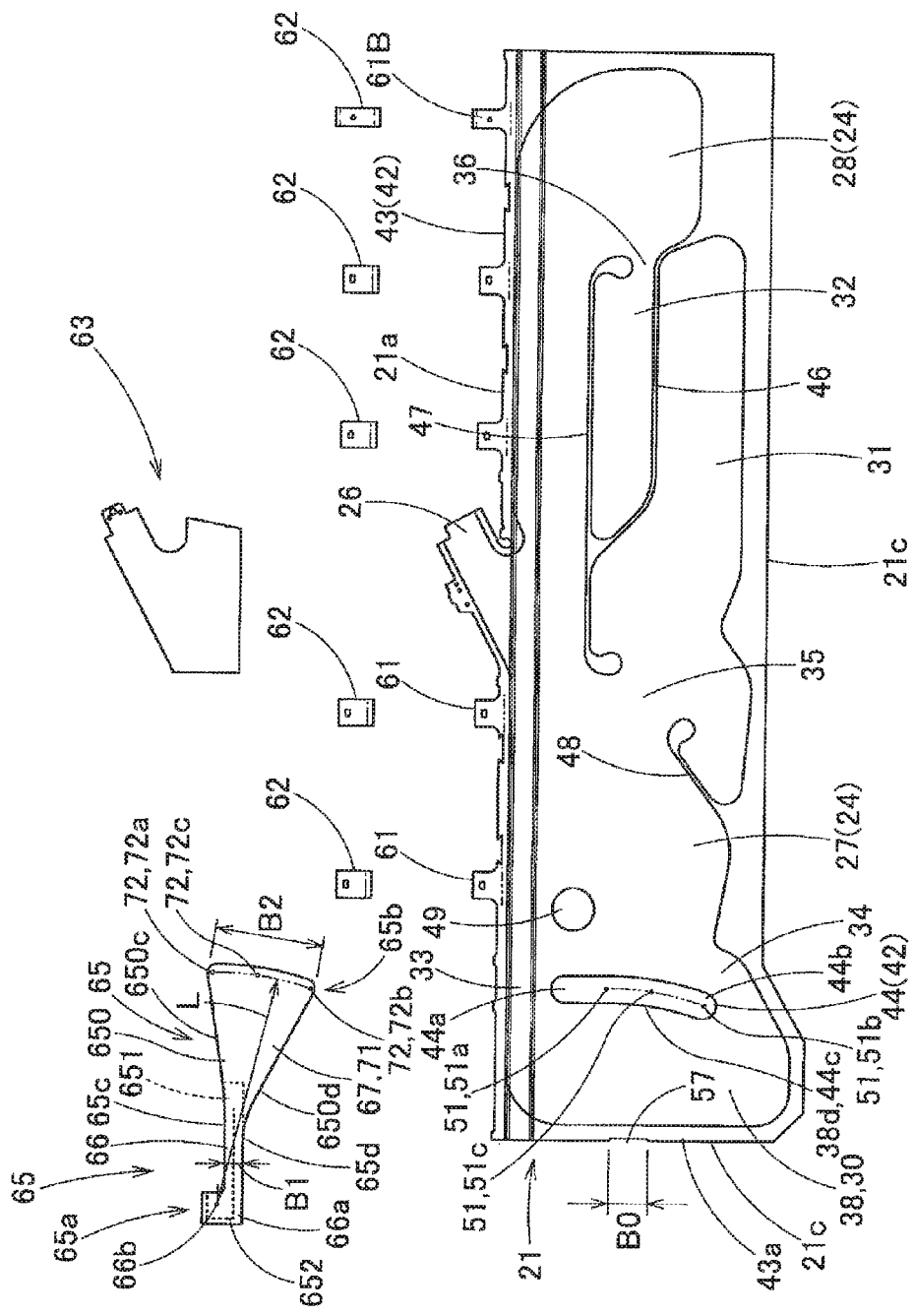
FIG. 4 is a front view illustrating constituent members of the curtain airbag of the embodiment.

As illustrated in FIGS. 2 to 4, a concave portion 57, which is concave toward the central side (in other words, the base portion 65b side of the connection belt 65) of the airbag body 21 in the front and rear direction in a substantially rectangular shape (substantially trapezoidal shape), is formed in a front periphery 43a of the peripheral edge 43 on the front periphery 21c side of the airbag body 21. The concave portion 57 is made in order to form the mark 53 for checking the proper arrangement state of the connection belt 65 so as to fold the airbag 20 in a state where the connection belt 65 is arranged in a proper position with respect to the airbag body 21. In the case of the embodiment the concave portion 57 is arranged in the intermediate portion of the front periphery 21c in the vertical direction. As illustrated in FIG. 3, the concave portion 57 is opened such that the width dimension 130 is wider than the vertical width dimension B1 of a narrow belt portion 66 of the connection belt 65. Further, in the case of the embodiment, the mark 53 includes an upper mark 54 and a lower mark 55 which are arranged in the vicinity of an upper periphery 65c and a lower periphery 65d in a case where the connection belt 65 is arranged in the proper arrangement state. The upper mark 54 has an upper crossing portion 58 between the front periphery 21c and an upper peripheral edge 57a of the concave portion 57, and particularly, is formed from a line of the upper peripheral edge 57a extending rearward from a corner 58a. The lower mark 55 has a lower crossing portion 59 between the front periphery 21c and a lower peripheral edge 57b of the concave portion 57, and particularly is formed from a line of the lower peripheral edge 57b extending rearward from a corner 59a.

The concave portion 57 is disposed such that the width dimension B0 is wider than the vertical width dimension B1 of the narrow belt portion 66 of the connection belt 65, and the vicinity of the belt portion 66 of the connection belt 65 in the proper arrangement state passes through the almost center of concave portion 57 in the vertical direction. For this reason, the upper ark 54 and the lower mark 55 of the mark 53 are arranged to have gaps h1, h2, and h3 from the upper periphery 65c and the lower peripheries 65d and 650d of the connection belt 65 in the proper arrangement state. The gaps h1, h2, and h3 are formed by the dimension of the acceptable arrangement difference of the connection belt 65. In the case of the embodiment; the gaps (acceptable arrangement difference dimension) h1 and h2 are 15 mm, and the gap (acceptable arrangement difference dimension) h3 is 12 mm.

Incidentally, the gap h1 is a vertical portion between the upper periphery 65c and the mark 54 in the belt portion 66 of the connection belt 65 in the proper arrangement state. The gap h2 is a portion by which the mark 55 is separated in the vertical direction from the lower periphery 65d of the belt portion 66 (belt body 651 (to be described later)), which has the width dimension B1 constantly in the vicinity of the concave portion 57, of the connection belt 65 in the proper arrangement state. The gap h3 is a portion by which the mark 55 is separated in the vertical direction from a curved lower periphery 650d of a main body 650 (to be described later), which is in the vicinity of the concave portion 57, of the connection belt 65 in the proper arrangement state.

Returning to the non-inflatable portion 42 of the airbag body 21, as described above, the end partition portion 44 partitions the front sub inflatable portion 30 and the front-seat protecting portion 27 (end inflatable portion 38 and general inflatable portion 39). In the case of the embodiment, the end partition portion 44 is configured such that both upper and lower ends are separated from the peripheral edge 43, and is configured as such a stick shape that is curved in a substantially arc shape substantially along the vertical direction such that the center in the vertical direction protrudes rearward. Specifically, the end partition portion 44 is formed to have such a continuous curved shape that the front periphery 44c makes an arc shape about the mounting portion 66a, so that the end partition portion 44 has almost the same shortest separation distance from the mounting portion 66a arranged on the tip 65a (front end) side of the connection belt 65 over the entire vertical area in a state where the connection belt 65 is coupled to the airbag body 21. In detail, the front periphery 44c of the end partition portion 44 has such an arc shape that the center of a mounting hole 66b formed in the mounting portion 66a is set as a center. In the case of the embodiment, an upper end 44a is formed to be positioned on the slightly rear side from the lower end 44b. In addition, the end partition portion 44 is configured such that the upper end 44a protrudes upward from a general partition portion 47. In addition, the end partition portion 44 is configured such that the lower end 44b almost matches with the belt line BL. Further, at the time of completion of inflation of the airbag 20, the end partition portion 44 is configured to be arranged in a position which corresponds to a portion 92a, which protrudes most outward in a case where the steering wheel airbag 92 is completely inflated, of the airbag 92 (see FIGS. 1 and 14).

Figure 5:
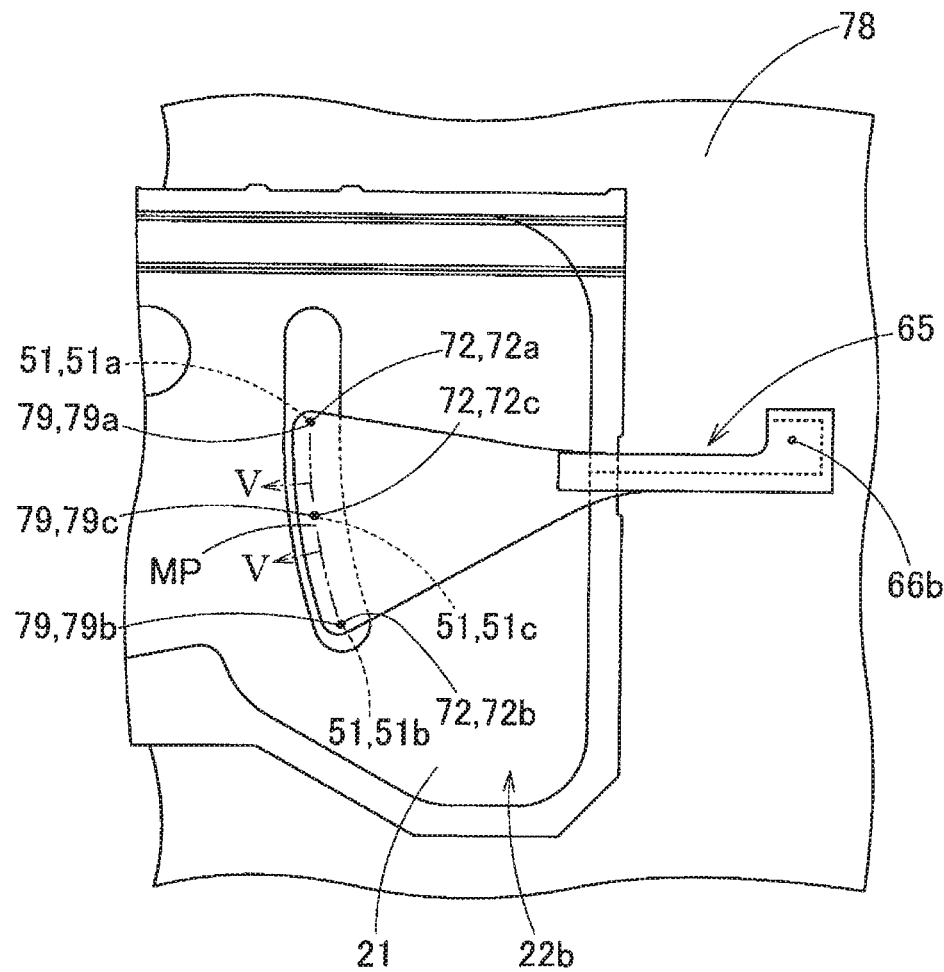
FIG. 5 is a view illustrating a proper set state when the connection belt is connected to the airbag body of the embodiment.
Figure 5:
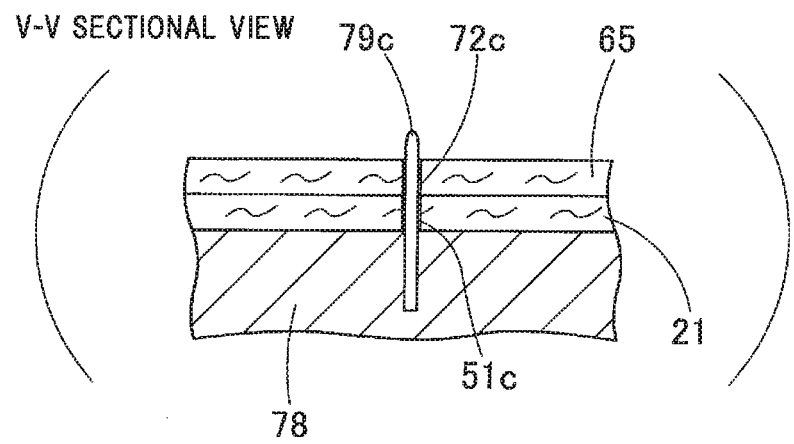
Figure 6:
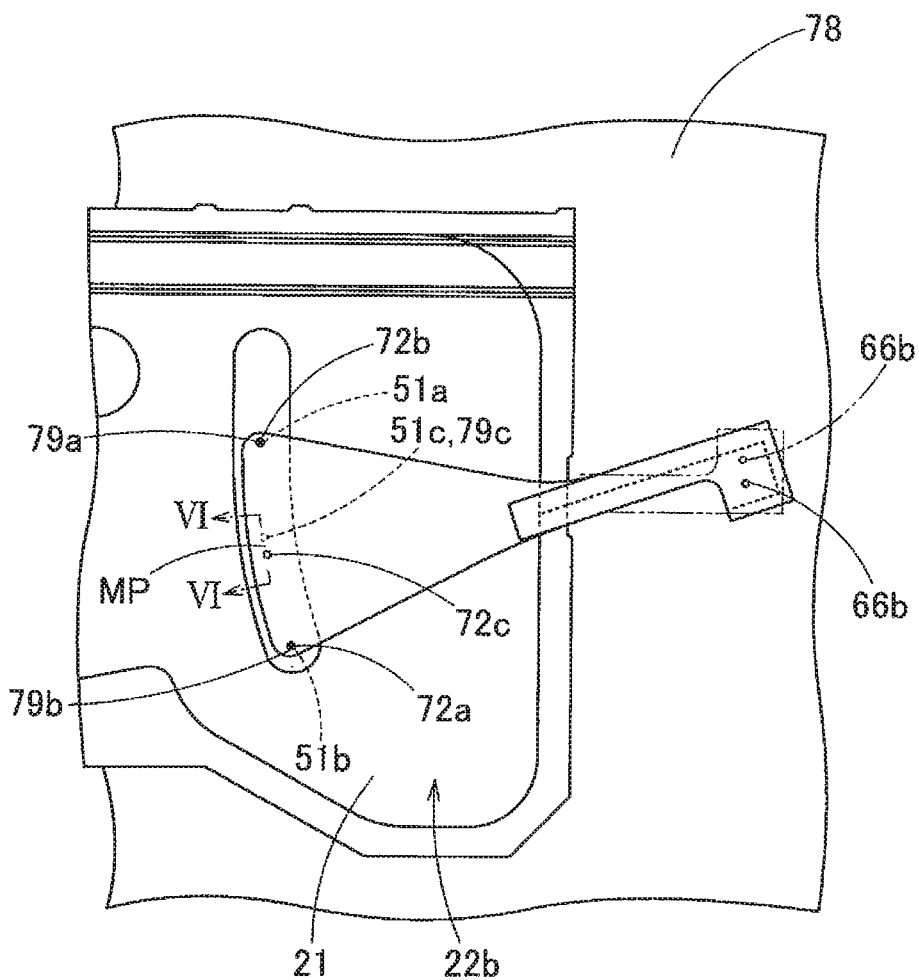
FIG. 6 is a view illustrating an erroneous assembly set state when the connection belt is connected to the airbag body of the embodiment.
Figure 6:
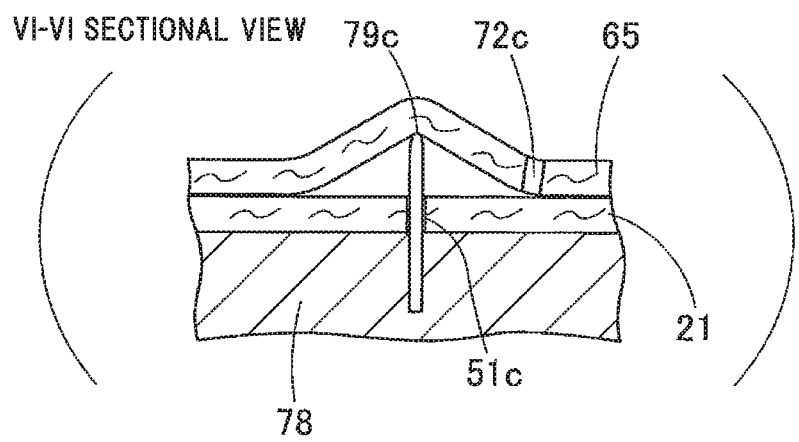

Setting holes 51 open in the circular shape penetrate in the end partition portion 44 such that the connection belt 65 can be set in a proper set position when the connection belt 65 is connected to the end partition portion 44 by sewing. As illustrated in FIGS. 5 and 6, the setting holes 51 are holes which fit respective setting pins 79 (upper pin 79a, lower pin 79b, and intermediate pin 79c) of a setting table 78 on which the sewing operation is performed. The setting holes 51 include an upper fitting portion 51a and a lower fitting portion 51b which are arranged on both upper and lower sides, and an intermediate fitting portion 51c between the fitting portions 51a and 51b. Incidentally, the intermediate fitting portion 51c is arranged to be deviated in the vertical direction from a position where the distance between the upper and lower fitting portions 51a and 51b is two-divided correctly. In the case of the embodiment, the intermediate fitting portion 51c corresponds to the intermediate pin 79c, and is disposed to be slightly deviated upward from a vertically middle position MP between the fitting portions 51a and 51b. As illustrated in FIG. 5, when the connection belt 65 is in the proper set position, the intermediate fitting portion 72c in the setting hole 72 of the connection belt 65 can be fitted to the intermediate pin 79c, but as illustrated in FIG. 6, when a connection belt 65 is arranged in a vertically-reversed erroneous assembly set position, the intermediate fitting portion 72c cannot be fitted to the intermediate pin 79c. Therefore, the assembly error (erroneous connection) of the connection belt 65 can be prevented in such a manner that, as described above, the intermediate fitting portion 51c or the intermediate pin 79c is arranged to be deviated in the vertical direction from the center between the fitting portions 51a and 51b or the pins 79a and 79b.

The general partition portions 46 and 47 are arranged in the area of the general inflatable portion 39, so that the general inflatable portion 39 is partitioned into the gas guidance path 25, the front-seat protecting portion 27, the rear-seat protecting portion 28, the central sub inflatable portion 31, and the rear sub inflatable portion 32. The general partition portion 46 is arranged in a forward-extending linear shape that extends upward from the lower periphery of the rear portion of the peripheral edge 43, so as to partition the central sub inflatable portion 31 and the rear sub inflatable portion 32. The general partition portion 47 configures the lower periphery of the gas guidance path 25, and is formed to extend to both front and rear sides from the upper end of the general partition portion 46 such that the central sub inflatable portion 31 and the rear sub inflatable portion 32 are partitioned from the gas guidance path 25.

A general partition portion 48 is formed to extend obliquely in a rear and upper direction from the front lower periphery of the peripheral edge 43 so as to partition the front-seat protecting portion 27 and the central sub inflatable portion 31.

The thickness regulating portion 49 has a circular outer shape, and is arranged in a position in the vicinity of the front end of the gas guidance path 25. The thickness regulating portion 49 is arranged to suppress that the front and upper portion of the front-seat protecting portion 27 configured integrally with the gas guidance path 25 is inflated thickly.

In the airbag 20 of the embodiment, a gap between the end partition portion 44 and the upper periphery of the peripheral edge 43 configures the communicating portion 33, and a gap between the end partition portion 44 and the lower periphery of the peripheral edge 43 configures the communicating portion 34. In addition, a gap between the front end of the general partition portion 47 and the upper end of the general partition portion 48 configures the communicating portion 35, and a gap between the rear end portion of the general partition portion 47 and the vicinity of the rear end of the general partition portion 46 configures the communicating portion 36.

The mounting portions 61 are plurally disposed in the upper periphery 21a of the airbag body 21 along the front and rear direction, and in the case of the embodiment, the five mounting portions are formed. A mounting hole 61a for inserting the mounting bolt 12 is formed in the mounting portion 61. Incidentally, the mounting portion 61 is formed in a double-layered structure in which a pad cloth 62 made of a woven cloth such as polyamide yarn or polyester yarn is overlappingly sutured in the double-woven cloth which extends upward from the upper periphery of the peripheral edge 43.

The connection belt 65 is configured from a sheet material having flexibility, and in the case of the embodiment, is formed of a woven cloth made of polyamide yarn or polyester yarn. As illustrated in FIGS. 2, 3, 14, and 15, the connection belt 65 is arranged on the outboard side O of the end inflatable portion 38 at the time of completion of inflation of the airbag body 21. The connection belt 65 is connected with the airbag body 21 by coupling the base portion 65b with the end partition portion 44 on the front end (end periphery) 21c side of the airbag body 21 in a suturing manner, and the mounting portion 66a arranged on the tip 65a side is fixed in the front periphery of the peripheral edge of the window W1 separated from the front end 21c of the airbag body 21 on the body 1 side of the vehicle V. Similarly to the mounting portion 61 formed in the airbag body 21, the mounting portion 66a is fixed in the inner panel 2 of the body 1 in a portion of in the front pillar FP by using the mounting bracket 11 and the mounting bolt 12, and includes the mounting hole 66b through which the mounting bolt 12 can be inserted.

In the case of the embodiment, as illustrated in FIGS. 3 and 4, the connection belt 65 includes the belt portion 66 which extends forward from the front periphery 21c of the airbag body 21, has the constant width dimension B1, and is provided with the mounting portion 66a having a substantially rectangular shape in the upper periphery of the tip (front end) 65a, and a fan-shaped enlarged portion 67 in which a vertical width dimension is gradually increased from the front periphery 21c to the base portion 65b. The connection portion 68 connected with the end partition portion 44 of the airbag body 21 is formed in the base portion 65b of the arc-shaped rear periphery of the enlarged portion 67. The front side of the enlarged portion 67 from the connection portion 68 serves as the support portion 71 which supports the outboard side O of the end inflatable portion 38.

In the case of the embodiment, the connection belt 65 is integrally configured to be provided with a sewn portion 652 of two layers of the main body 650 and the belt body 651 which reinforces the belt portion 66. The belt body 651 is configured to form the belt portion 66 which has the mounting portion 66a and has the constant vertical width dimension B1, and is formed to extend in a belt shape to the area of the end inflatable portion 38. The main body 650 forms the entire area of the connection belt 65 itself. Further, in the case of the embodiment, in the connection belt 65 in the proper arrangement state, the lower periphery 650d of the main body 650 is arranged directly below the mark 55 in the vicinity of the concave portion 57 of the airbag body 21. However, the lower periphery 65d of the belt portion 66 is configured of the lower periphery of the belt body 651 arranged in a linear shape along the front and rear direction, and thus it is easy to check whether the gap h2 from the mark 55 exists. For this reason, in the case of the embodiment if the gaps h2 and h3 are arranged between the mark 55, and the lower periphery 650d of the main body 650 and the linear lower periphery 65d of the belt portion 66, it is determined that the connection belt 65 is arranged in the proper arrangement state.

In the base portion 65b of the rear periphery of the connection belt 65, the setting hole 72 is formed to be fittable to the setting pin 79 of the setting table 78 in which the sewing operation of the connection belt 65 and the pad cloth 62 is performed. That is, the setting hole 72 open in a circular shape, that is, the upper fitting portion 72a, the lower fitting portion 72b, and the intermediate fitting portion 72c are disposed to correspond to the setting hole 51 (upper fitting portion 51a, lower fitting portion 51b, and intermediate fitting portion 51c) of the airbag body 21, whereby in order that the upper pin 79a, the lower pin 79b, and the intermediate pin 79c of the setting pin 79 can be fitted thereto when the connection belt 65 is arranged in the proper set position of the airbag body 21.

The connection portion 68 to the end partition portion 44 of the airbag body 21 is formed of a two-divided sewn portion in which the connection portion is divided in the vicinity of the intermediate fitting portion 72c into an upper portion 69 between the upper fitting portion 72a and the intermediate fitting portion 72c, and a lower portion 70 between the intermediate fitting portion 72c and the lower fitting portion 72b. The upper portion 69 and the lower portion 70 of the connection portion 68 correspond to the front periphery 44c of the end partition portion 44, and are each configured in such a curved shape that is connected to make an arc shape about the mounting portion 66a on the tip 65a side. That is, in the connection portion 68, an area from an upper end connection point 69a of the upper end of the upper portion 69 to a lower end connection point 70b of the lower end of the lower portion 70 is formed in an arc shape centered on the center of the mounting hole 66b formed in the mounting portion 66a. In other words, in the embodiment, in the connection portion 68, the upper end connection point 69a and the lower end connection point 70b arranged in two vertically-separated positions are configured to have the same and shortest separation distance L (see FIG. 3) from the mounting portion 66a. Further, similarly, an intermediate lower connection point 69b of the lower end of the upper portion 69 in the portion of the connection portion 68 in the vicinity of the intermediate fitting portion 72c, or an intermediate upper connection point 70a of the upper end of the lower portion 70 are configured to have a curved shape which continuously makes an arc shape about the mounting portion 66a. Further, in other words, in the embodiment, the connection portion 68 is configured to have an arc shape with a radius L, and is configured such that a position where the base portion 65b of the connection belt 65 is coupled to the airbag body 21 is not provided in a portion, which has a shorter separation distance than the separation distance from the mounting portion 66a, in the upper end connection point 69a and the lower end connection point 70b on the upper and lower sides. In addition, in the connection portion 68 of the embodiment, the upper end connection point 69a is arranged in almost vertically the same position as the general partition portion 47 slightly above the mounting portion 66a, and the lower end connection point 70b is arranged on the lower end 44b side of the end partition portion 44 below the mounting portion 66a. Incidentally, in the case of the embodiment, the upper portion 69 and the lower portion 70 of the connection portion 68 are sutured with the end partition portion 44 by being sewn by a predetermined suture in a suture line with a double-linear shape. The connection belt 65 is configured such that the tension T1 (see FIG. 1) is generated substantially along the front and rear direction at the time of completion of inflation of the airbag body 21. Specifically, in the airbag 20 of the embodiment, at the time of completion of inflation in a state where the airbag is mounted to the vehicle, the radial tension T1 is generated over the almost entire upper and lower areas of the connection portion 68 between the mounting portion 66a and the connection portion 68 of the connection belt 65. Further, in the airbag body 21, at the time of completion of inflation, the front-seat protecting portion 27, the rear-seat protecting portion 28, the central sub inflatable portion 31, and the rear sub inflatable portion 32 are each inflated from a non-inflated state such that the width dimension in the front and rear direction is shortened. Thus, also between the end partition portion 44 and a rear end mounting portion 61B, a tension T2 (see FIG. 1) is generated substantially along the front and rear direction on a straight line in which the vicinity of the almost vertical center of the end partition portion 44 is connected with the mounting portion 61B.

In the vehicle V mounted the head-protecting airbag device M of the embodiment, a steering wheel airbag device 91 which is operated when the impact force acts from the front side of the vehicle V is mounted in the steering wheel 90 arranged on the front side of the driver seat DS (see FIGS. 1, 14, and 15). The airbag device 91 includes the airbag 92 which is accommodated in a boss portion 90a of the steering wheel 90 in a folded state, and an inflator (not illustrated) which supplies the inflation gas to the airbag 92. When the impact force including the case of an oblique collision acts from the front side, the airbag 92 allows the inflation gas to flow in to be inflated to cover the entire upper surface of a ring portion 90b of the steering wheel 90.

Next, the description will be given about an operation in which the head-protecting airbag device M of the embodiment is mounted in the vehicle V. First, the predetermined pad cloth 62 is sewn in the airbag body 21 to form the mounting portion 61, and the connection belt 65 is connected to the airbag body 21 to produce the airbag 20. Further, as illustrated in FIG. 5, the operation which performs sewing to form the mounting portion 61 and sews the base portion 65b of the connection belt 65 in the end partition portion 44 of the airbag body 21 is performed in a state where the airbag body 21 is set in the predetermined setting table 78 where the sewing operation is performed, and further, the pad cloth 62 and the connection belt 65 are set. Further, in the setting position of the connection belt 65, first, the outboard side wall 22b of the airbag body 21 is arranged on the upper surface with respect to the upper pin 79a, the lower pin 79b, and the intermediate pin 79c of the setting pin 79 of the setting table 78, so as to fit the upper fitting portion 51a, the lower fitting portion 51b, and the intermediate fitting portion 51c of the setting hole 51.

Incidentally, the connection belt 65 abuts on the surface of the outboard side wall 22b of the airbag body 21, and the upper fitting portion 72a, the lower fitting portion 72b, and the intermediate fitting portion 72c in the setting hole 72 of the connection belt 65 are fitted with respect to the upper pin 79a, the lower pin 79b, and the intermediate pin 79c of the setting pin 79.

At that time, mainly as illustrated in FIG. 5, in the proper set position, the intermediate fitting portion 72c of the connection belt 65 can be fitted to the intermediate pin 79c. However, as illustrated in FIG. 6, in the case of the assembly error in which the connection belt 65 is vertically reversed, the intermediate fitting portion 72c of the connection belt 65 cannot be fitted in the intermediate pin 79c. Thus, the assembly error can be perceived, and the connection belt 65 can be set in a proper posture. Further, after a proper setting, the connection portion 68 may be formed by the sewing operation, and the connection belt 65 may be connected in the airbag body 21, so as to produce the airbag 20.

After the airbag 20 is produced, the airbag body 21 in a state where the inboard side wall 22a and the outboard side wall 22b are overlappingly deployed flatly is folded together with the connection belt 65 such that the lower periphery 21b approaches the upper periphery 21a, whereby folding the airbag 20.

Figure 7A:
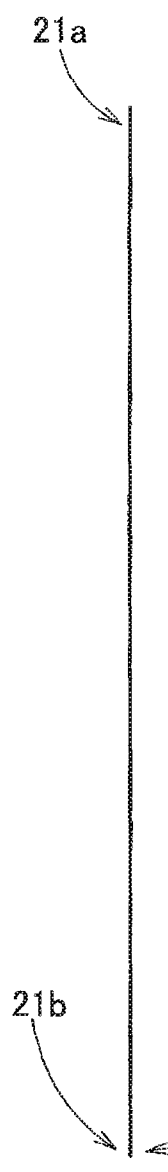
FIGS. 7A to 7C are views illustrating a folded shape of the curtain airbag of the embodiment.
Figure 7B:
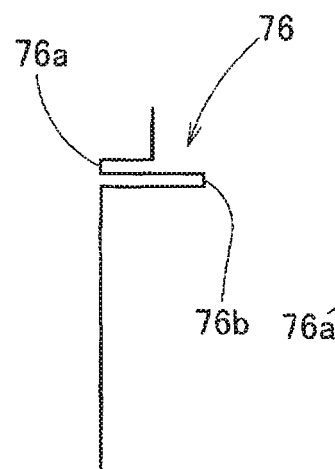
Figure 7C:
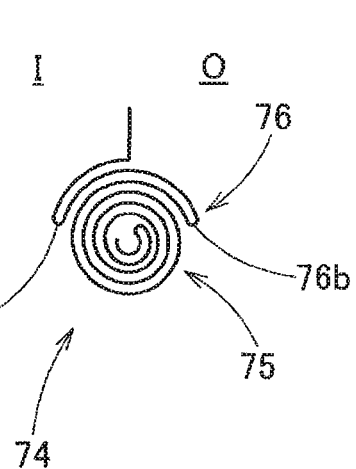
Figure 8:
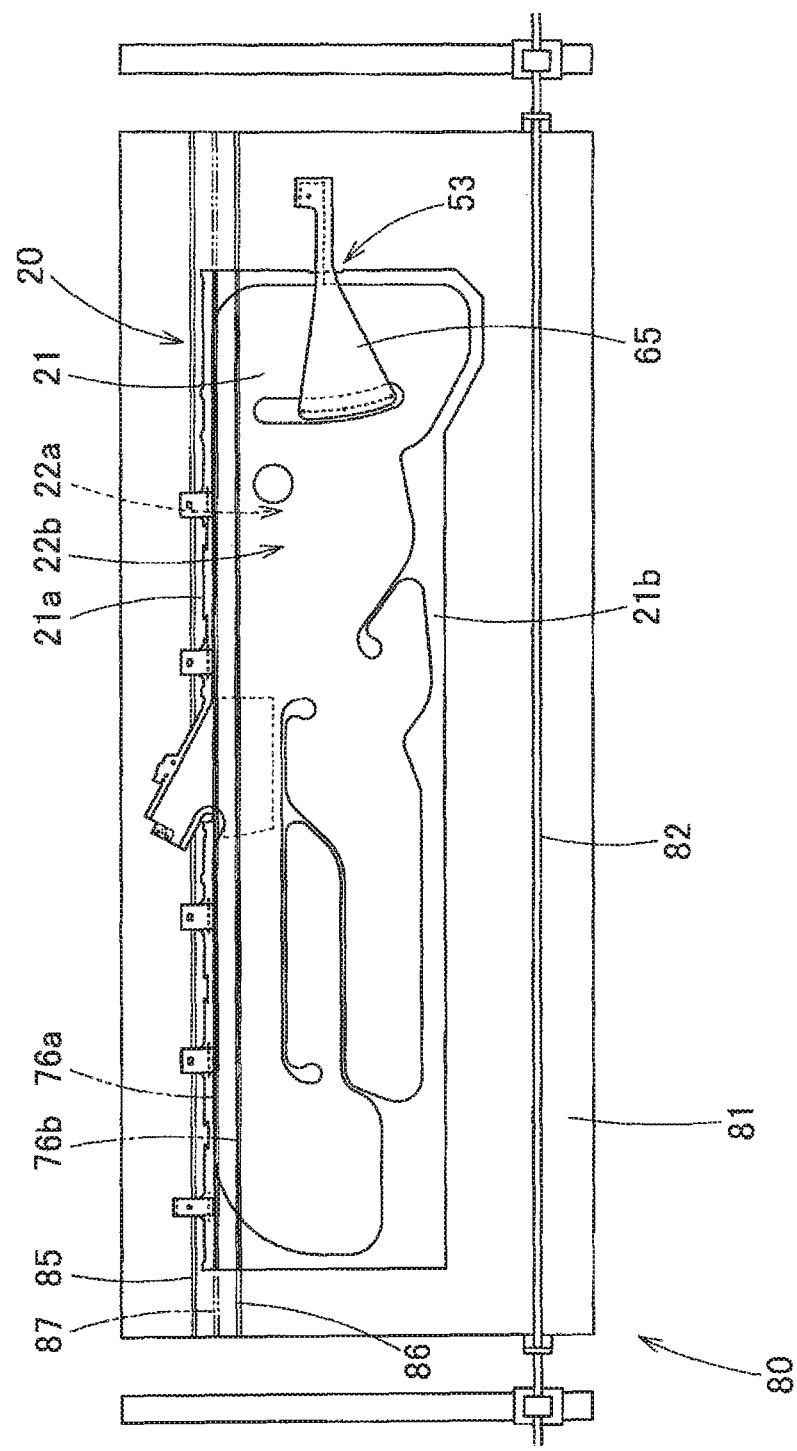
FIG. 8 is a schematic plan view illustrating a folding machine which is used for a folding process of the curtain airbag of the embodiment.

At that time, as illustrated in FIGS. 7A to 7C, the airbag 20 of the embodiment is folded by using the folding machine 80 illustrated in FIG. 8 so that a roll-folding portion 75 and the bellow-folded portion 76 are provided. That is, in the embodiment, the roll-folding portion 75 is formed such that the lower periphery 21b of the airbag body 21 of the airbag 20 is wound toward the outboard side wall 22h to be roll-folded so as to approach the upper periphery 21a. The vicinity of the gas guidance path 25 near the upper periphery 21a is formed into the bellow-folded portion 76 superimposed by a bellow-folding that provides two creases 76a and 76b along the front and rear direction.

In other words, the roll-folding portion 75 is a portion from the lower periphery 21b of the airbag body 21 to the vicinity of the lower periphery of the gas guidance path 25 exceeding the arrangement area of the connection belt 65. In addition, the bellow-folded portion 76 is an area above the roll-folding portion 75 of the airbag body 21. Incidentally, at the time of the roll-folding, a terminal 21ba of the lower periphery 21b of the airbag body 21 is wound over the almost entire circumference of the outer circumferential surface 82a of the folding stick 82 in order to adsorb the airbag body 21 on the folding stick 82 (see FIGS. 11A and 11B). Then, the terminal 21ba is folded toward the outboard side wall 22b.

As illustrated in FIGS. 8 to 11B, the folding machine 80 includes a setting table 81 on which the flatly-deployed airbag 20 is placed with the inboard side wall 22a set as a lower side, a substantially cylindrical folding stick 82 disposed along the front and rear direction of the roll-folding airbag 20, and rectangular plate-shaped folded plates 85, 86, and 87 for bellow-folding which are disposed along the front and rear direction to move vertically.

In the folding stick 82, a plurality of suction openings 83 are open to penetrate an inner and outer circumference (see FIGS. 11A and 11B) such that air is suctioned from the suction opening 83. The folding stick 82 is configured to move on the setting table 81 in parallel to setting table 81 from the lower periphery 21b of the airbag body 21 to the upper periphery 21a while rotating, such that the roll-folding portion 75 can be formed. In addition, the folded plates 85 and 87 are disposed to protrude upward from the setting table 81, and the folded plate 86 is disposed to press from above the position of the bellow-folding crease 76a along the front and rear direction of the set airbag body 21. The folded plate 87 is disposed to press upward the position of the bellow-folding crease 76b along the front and rear direction from below.

Figures 9A, 9B, 9C:
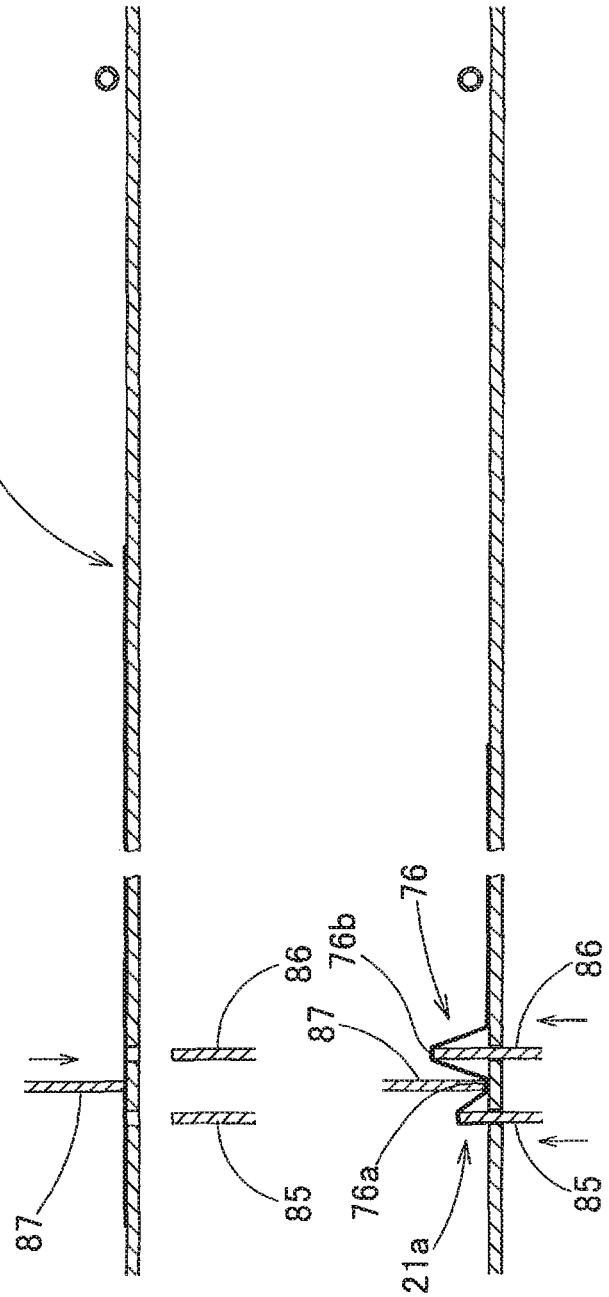
FIGS. 9A to 9C are views illustrating the folding process of the curtain airbag of the embodiment in order.
Figure 12A:
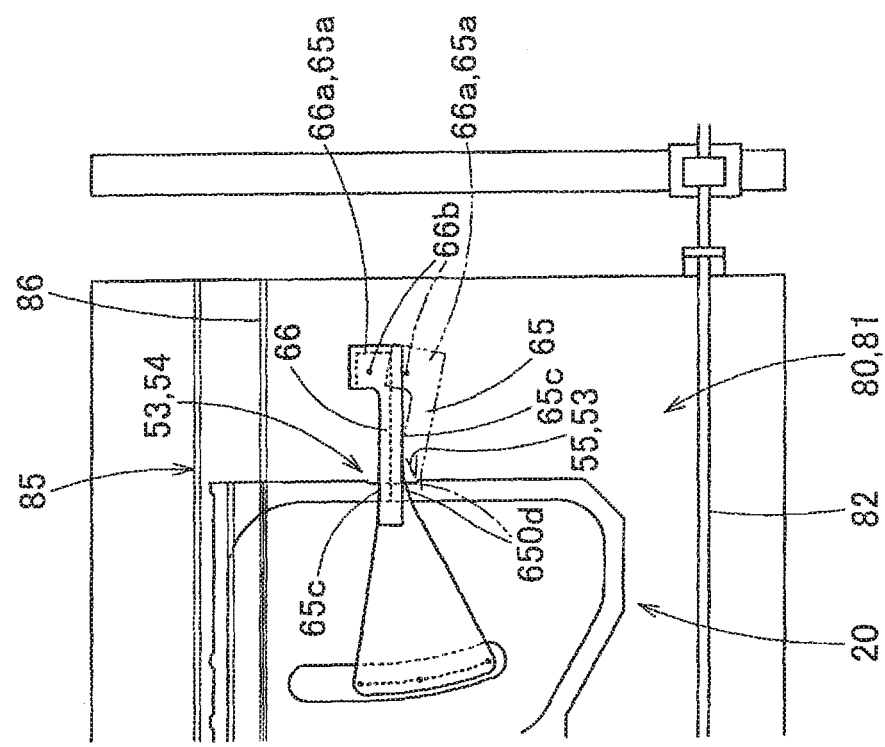
FIGS. 12A and 12B are views illustrating a state at a setting time indicating a time of checking a proper arrangement state of the connection belt of the embodiment and a state in the middle of folding.

The description will be given about the folding process of the airbag 20 using the folding machine 80. First, as illustrated in FIGS. 8 and 9A, the airbag 20 is set on the upper surface of the setting table 81 above the inboard side wall 22a. Further, as illustrated in FIG. 99, the folded plate 86 is lowered to nip a portion of the crease 76a by the setting table 81 and the folded plate 86. Further, as illustrated in FIG. 9C, the folded plates 85 and 87 are raised to bend the upper periphery 21a of the airbag body 21 such that the creases 76a and 76b of the bellow-folded portion 76 are easily attached. Further, as illustrated in FIG. 12A, at the time of setting or bending the airbag 20, it is checked whether the connection belt 65 becomes in the proper arrangement state, that is, the upper mark 54 and the lower mark 55 of the mark 53 can be together recognized visually in the vicinity of the upper periphery 65c and the lower peripheries 65d and 650d of the flatly-deployed connection belt 65. Further, as illustrated by a two-dot chain line in FIG. 12A, if one (the lower mark 55 in the drawing) of the upper mark 54 and the lower mark 55 of the mark 53 is hidden by the connection belt 65, the connection belt 65 is not in the proper arrangement state. Thus, the posture of the connection belt 65 is corrected to be in the proper arrangement state such that the upper mark 54 and the lower mark 55 can be recognized visually.

Figure 11A:
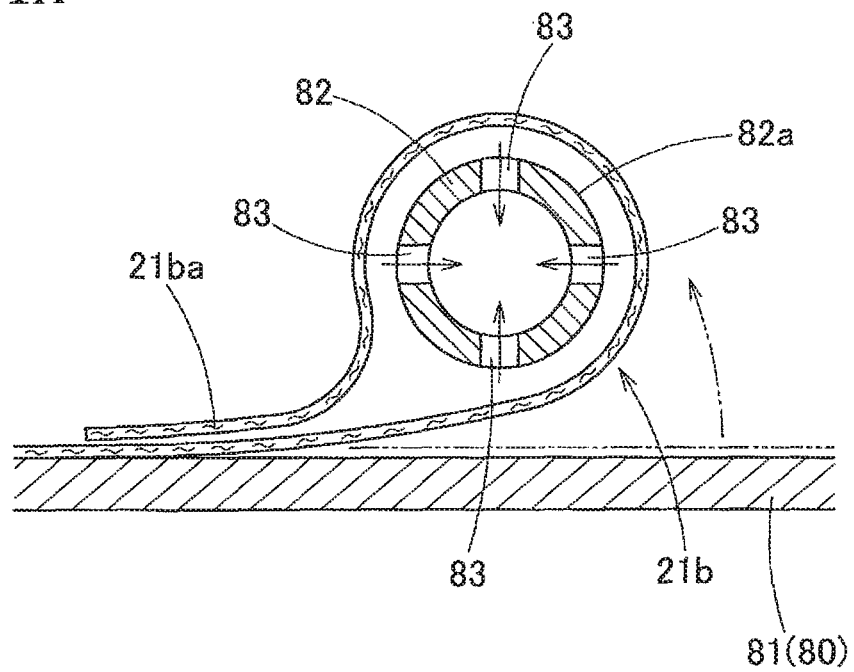
FIGS. 11A and 11B are views illustrating a state where a lower periphery of the curtain airbag of the embodiment is wound on a folding stick in order.
Figure 11B:
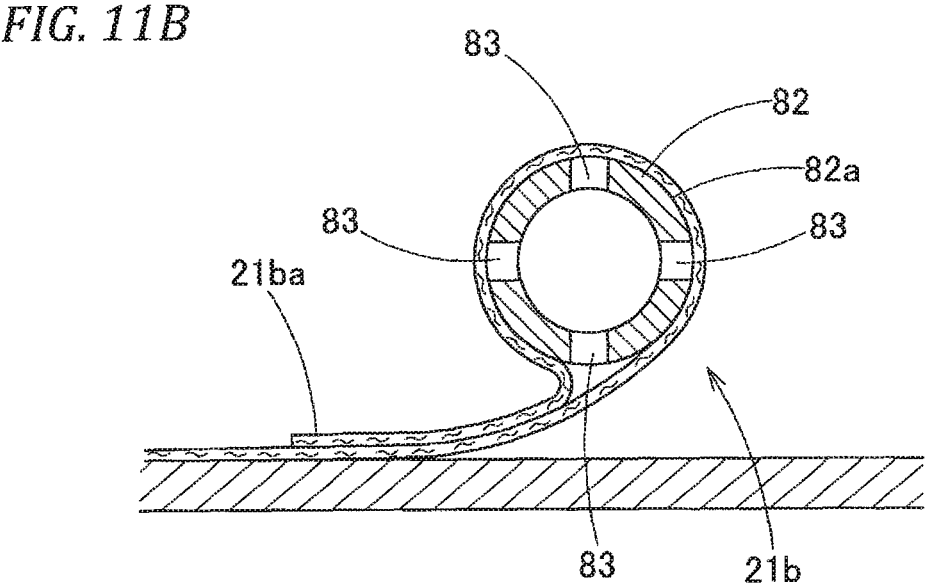

Thereafter, as illustrated in FIGS. 10A and 11A, the folding stick 82 is arranged above the upper periphery 21a of the terminal 21ba of the lower periphery 21b of the airbag body the terminal 21ba is folded back to be placed on the folding stick 82 so as to warp the folding stick 82. Next, as illustrated in FIGS. 10B and 11B, if the folding stick 82 is rotated in a counterclockwise direction while the air is suctioned through the suction opening 83, the airbag body 21 is wound on the folding stick 82 by an outside roll-folding that winds the lower periphery 21b toward the outboard side wall 22b.

Figure 12B:
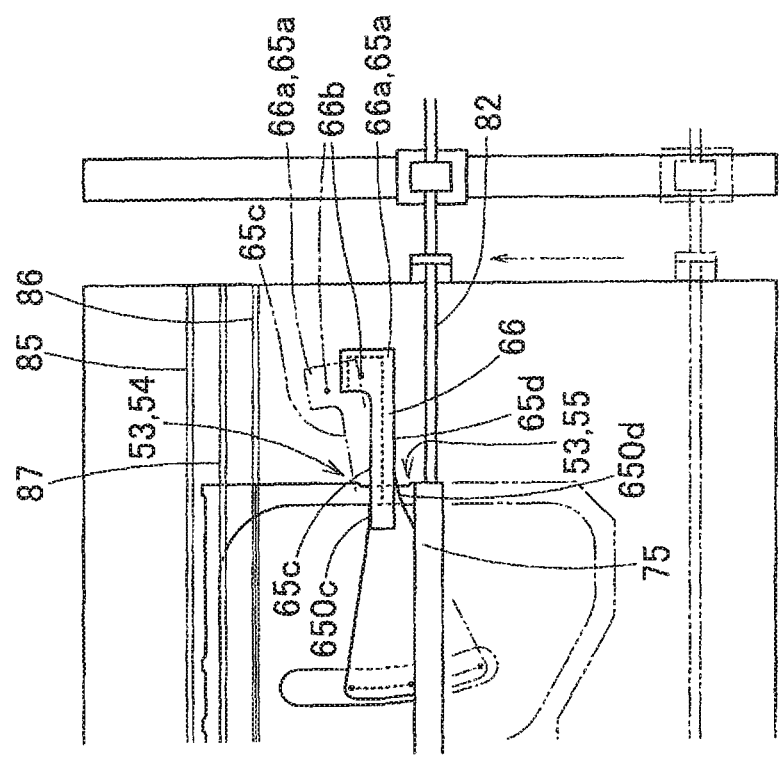
Figure 13:
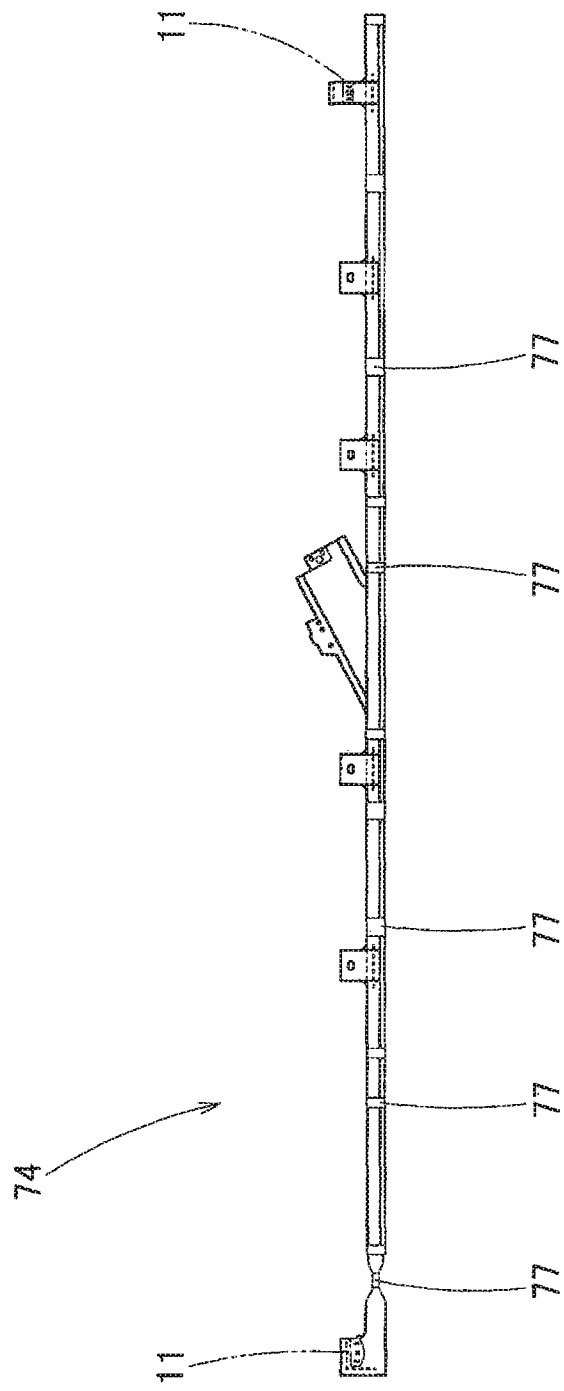
FIG. 13 is a front view illustrating a completely folded body of the curtain airbag of the embodiment.

As illustrated in FIG. 12B, even in the middle of the folding, it is checked whether the connection belt 65 becomes in the proper arrangement state, that is, the upper mark 54 and the lower mark 55 of the mark 53 can be together recognized visually in the vicinity of the upper periphery 65c and the lower peripheries 65d and 650d of the flatly-deployed connection belt 65. Further, as illustrated by a two-dot chain line in FIG. 12B, if one (upper mark 54 in the drawing) of the upper mark 54 and the lower mark 55 of the mark 53 is hidden by the connection belt 65, the connection belt 65 is not in the proper arrangement state. Thus, the rotation of the folding stick 82 is stopped, and the folding stick 82 is inverted appropriately to release the folding. The posture of the connection belt 65 is corrected to be in the proper arrangement state such that the upper mark 54 and the lower mark 55 can be recognized visually, and then the operation may be performed again.

As illustrated in FIG. 10B, after the roll-folding portion 75 becomes in the state of being wound on the folding stick 82, the folded plates 85, 86, and 87 of the folding machine 80 are separated from the airbag 20 while the airbag 20 is nipped, such that the bellow-folded portion 76 is pushed to the roll-folding portion 75. Further, when the airbag 20 is pulled out from the folding stick while the air blows out from the suction opening 83 of the folding stick 82, the folding can be completed. Thereafter, as illustrated in FIG.

13, when a wrapping material 77 for preventing folding collapse, which is breakable at the time of inflation of the airbag 20, such as a tape is wound in a predetermined position, the completely folded body 74 of the airbag 20 can be formed.

Thereafter, the inflator 14 having mounted with the mounting bracket 16 is connected with the connection opening 26 of the airbag 20 by using the clamp 15, and the mounting bracket 11 is firmly fixed in each of the mounting portion 66a of the connection belt 65 and the mounting portion 61 of the airbag body 21, thereby forming an airbag assembly.

Next, the mounting brackets 11 and 16 are arranged in predetermined positions of the inner panel 2 of the body 1 and are fixed by the bolts 12 and 17, and a lead wire (not illustrated) which extends from a control device for operating the predetermined inflator is connected to the inflator 14. The front pillar garnish 4 and the roof head lining 5 are mounted in the inner panel 2 of the body 1, and further, the pillar garnishes 6 and 7 are mounted in the inner panel 2 of the body 1, whereby the head-protecting airbag device M can be mounted in the vehicle V.

In a state where the head-protecting airbag device M of the embodiment is mounted in the vehicle V, at time of the side collision, the oblique collision, or the rollover of the vehicle V, the operation signal is received from the control device to operate the inflator 14, and the inflation gas discharged from the inflator 14 flows in the airbag body 21. The inflating airbag body 21 breaks the wrapping material 77 to press and open the airbag cover 9 configured from the lower periphery of the front pillar garnish 4 and the roof head lining 5, and further protrudes downward. As illustrated by a two-dot chain line of FIG. 1 or in FIGS. 14 and 15, the airbag body 21 is largely inflated to cover the inboard side of the windows W1 and W2, the center pillar CP, and the rear pillar RP. In addition, as illustrated by the two-dot chain line of FIG. 1 or FIGS. 14 and 15, at the time of the oblique collision, the steering wheel airbag device 91 which is mounted in the steering wheel 90 on the front side of the driver seat DS is also operated to inflate the airbag 92. Further, at the time of completion of inflation of the airbag 20, in the head-protecting airbag device M of the embodiment, the tension T1 is generated between the mounting portion 66a and the connection portion 68 in the connection belt 65. Thus, the end inflatable portion 38 is bent in a portion of the end partition portion 44 with respect to the general inflatable portion 39 while the outboard side O thereof is supported by the support portion 71 of the connection belt 65, and is extruded on the inboard side I by the connection belt 65. As illustrated in FIG. 14, the end inflatable portion 38 is arranged to be inclined and protrude to the inboard side I such that the front periphery 38c is directed to the inboard side I.

As described above, in the airbag 20 of the embodiment, as illustrated in FIG. 12A, when the connection belt 65 is flatly deployed together with the airbag body 21 before folding, the upper mark 54 and the lower mark 55 of the mark 53 can be visually recognized simultaneously in the vicinity of the upper periphery 65c and the lower periphery 65d of the connection belt 65, it can be checked that the connection belt 65 is in the proper arrangement state. Thereafter, as illustrated in FIG. 12B, when the outside roll-folding is in progress, or when the connection belt 65 is folded integrally with the airbag body 21, if the mark 53 (54 and 55) can be visually recognized simultaneously in the vicinity of the upper periphery 65c and the lower peripheries 65d and 650d of the connection belt 65 respectively, it can be checked that the airbag body 21 is folded in a state where the connection belt 65 is in the proper arrangement state.

That is, in the airbag 20 of the embodiment, merely by visually recognizing the mark 53 (54 and 55) in the vicinity of the upper periphery 65c and the lower peripheries 65d and 650d of the connection belt 65, the proper arrangement state of the connection belt 65 can be checked before folding or in the middle of folding, and the folding operation can be performed efficiently and smoothly. Of course, if the mark 53 cannot be recognized visually, the operation is suspended, and the arrangement of the connection belt 65 is corrected to the proper arrangement such that the mark 53 can be recognized visually. Thereafter, the operation may start again, and the folding operation can be performed efficiently and smoothly.

The mark 53 may be arranged merely to visually recognized at least in the vehicle side wall of the airbag body, and can be disposed to be separated from the connection belt 65. Thus, the function of the connection belt 65 is not hindered which allows the inflatable portion 38 on the end periphery 21c side of the airbag body 21 at the time of completion of inflation to be extruded toward the inboard side (indoor side) 1.

Therefore, in the airbag 20 of the embodiment, the folding operation can be performed efficiently and smoothly while the function of the connection belt 65 is not hindered.

Further, in the airbag 20 of the embodiment, the mark 53 is formed from the concave portion 57 formed by cutting the airbag body 21, and does not protrude from the surface of the outboard side wall 22b.

For this reason, in such a configuration, merely, the concave portion 57 is cut when the airbag body 21 is cut from the double-woven airbag material for producing the airbag body 21. Thus, simply, the mark 53 can be arranged while the flexibility of the airbag body 21 is not hindered. Of course, the mark 53 can be formed by cutting the concave portion 57, and does not protrude from the outboard side wall 22b of the airbag body 21, that is, the thickness of the airbag body 21 is not increased. Thus, it can be prevented that the volume of the folded airbag 20, that is, the completely folded body 74 is increased.

Figure 16:
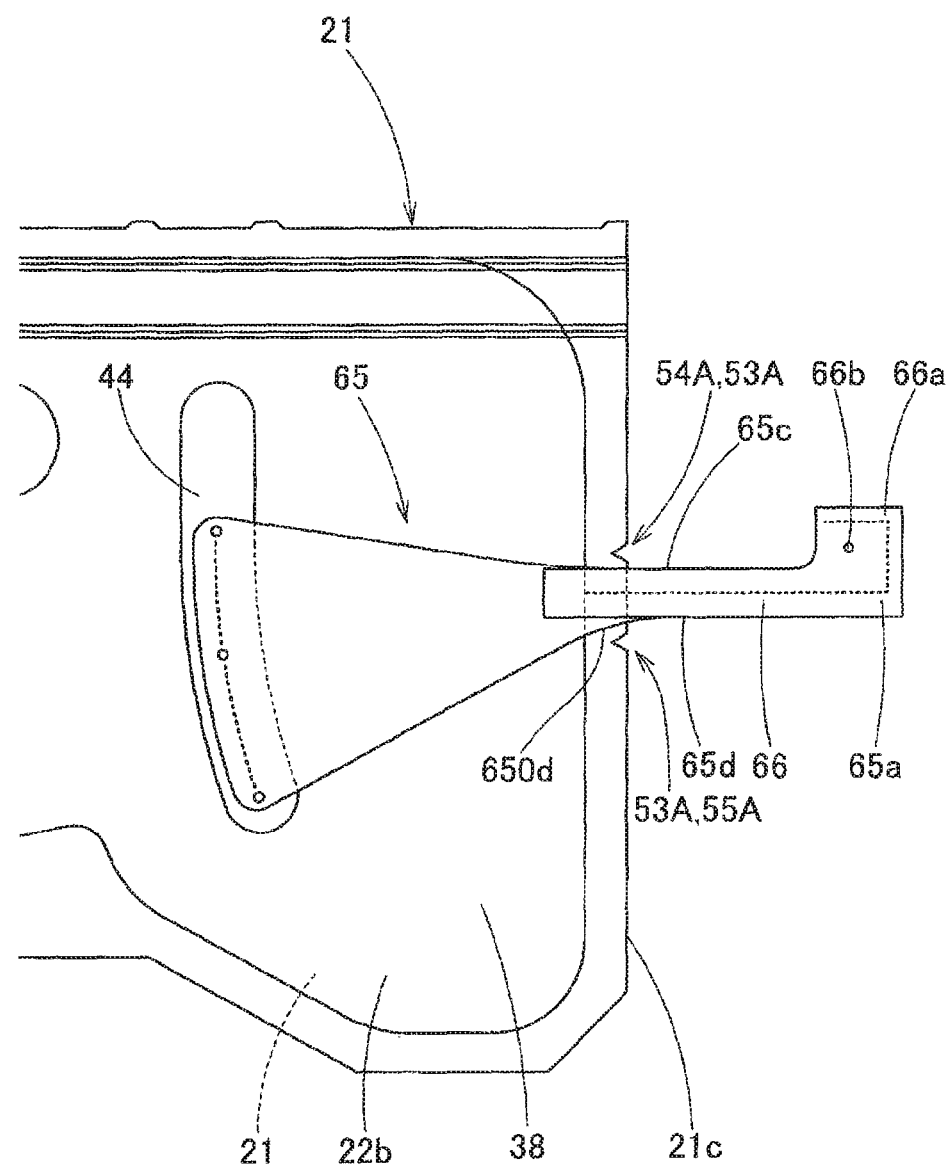
FIG. 16 is a view illustrating a mark of a modification of the embodiment.
Figure 17:
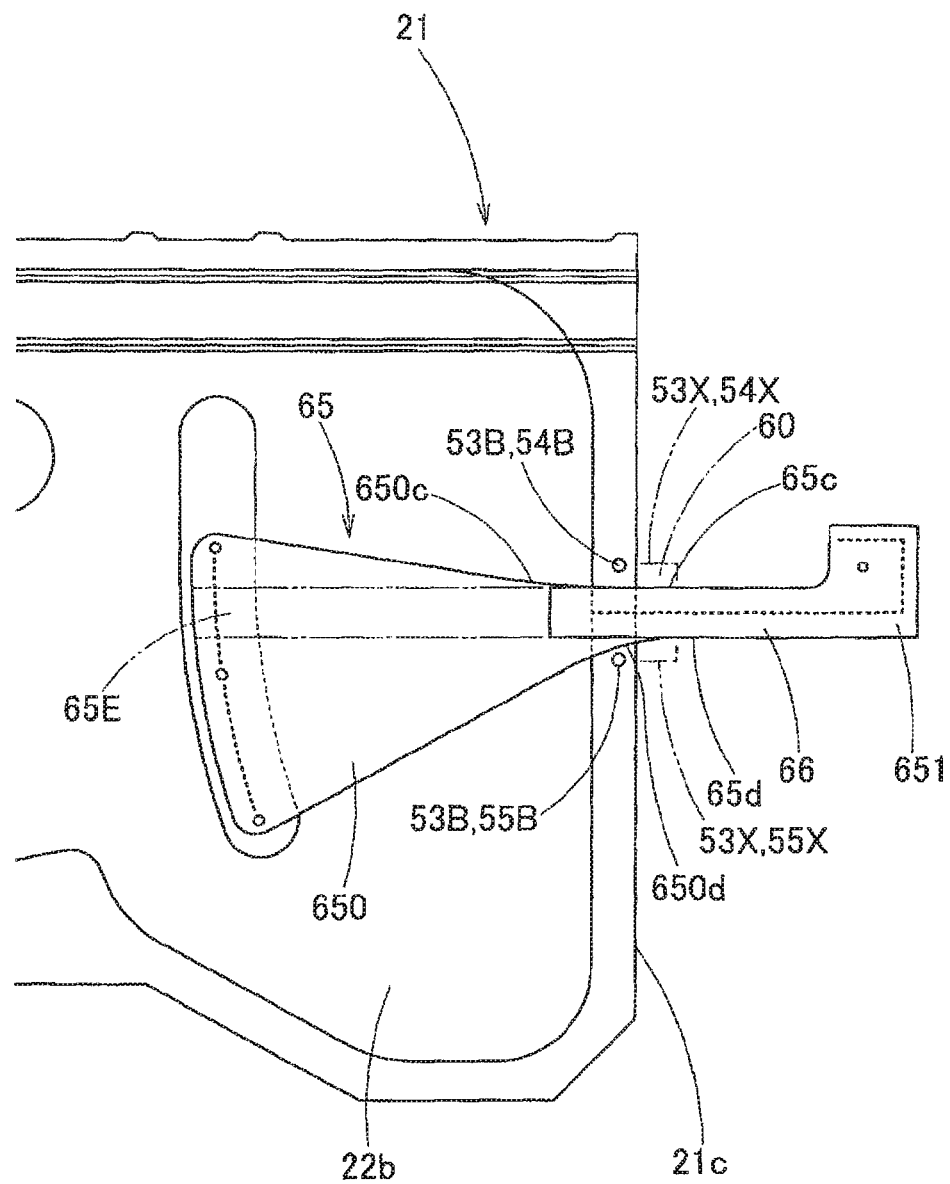
FIG. 17 is a view illustrating of a mark of another modification of the embodiment.

Incidentally, in a case where the mark is arranged by providing a notch in the airbag material (airbag body 21), like the mark 53A illustrated in FIG. 16, the upper mark 54A and the lower mark 55A may be provided by providing a notch (V-shaped groove) in the vicinity of the upper periphery 65c and the lower peripheries 65d and 650d of the connection belt 65 in the proper arrangement state, or like the mark 53B illustrated in FIG. 17, the upper mark 54B and the lower mark 55B may be provided by providing a through hole in the vicinity of the upper periphery 65c and the lower peripheries 65d and 650d of the connection belt 65 in the proper arrangement state.

Incidentally, as illustrated by the two-dot chain line of FIG. 17, a protruding piece 60 is provided which is not notched so as not to protrude from the surface of the outboard side wall 22b, protrudes forward in the front and rear direction from the end periphery 21c of the airbag body 21, and has a substantially rectangular plate shape. As a mark 53X in the vicinity of the upper periphery 65c and the lower periphery 65d of the connection belt 65 in the proper arrangement state, the upper periphery and the lower periphery of the protruding piece 60 can be used as an upper mark 54X and a lower mark 55X. However, in a case where the airbag material is double-woven, and the airbag material is cut to produce the airbag body 21 with the substantially rectangular shape so that the airbag body 21 can be obtained in many pieces in a vertical direction of the mounted state, the protruding piece 60 is provided which protrudes forward to the front end 21c of the airbag body 21, the upper and lower portions of the airbag material of the protruding piece 60 are cut and discarded, and thus yield is deteriorated, which is not preferable.

Figure 18:
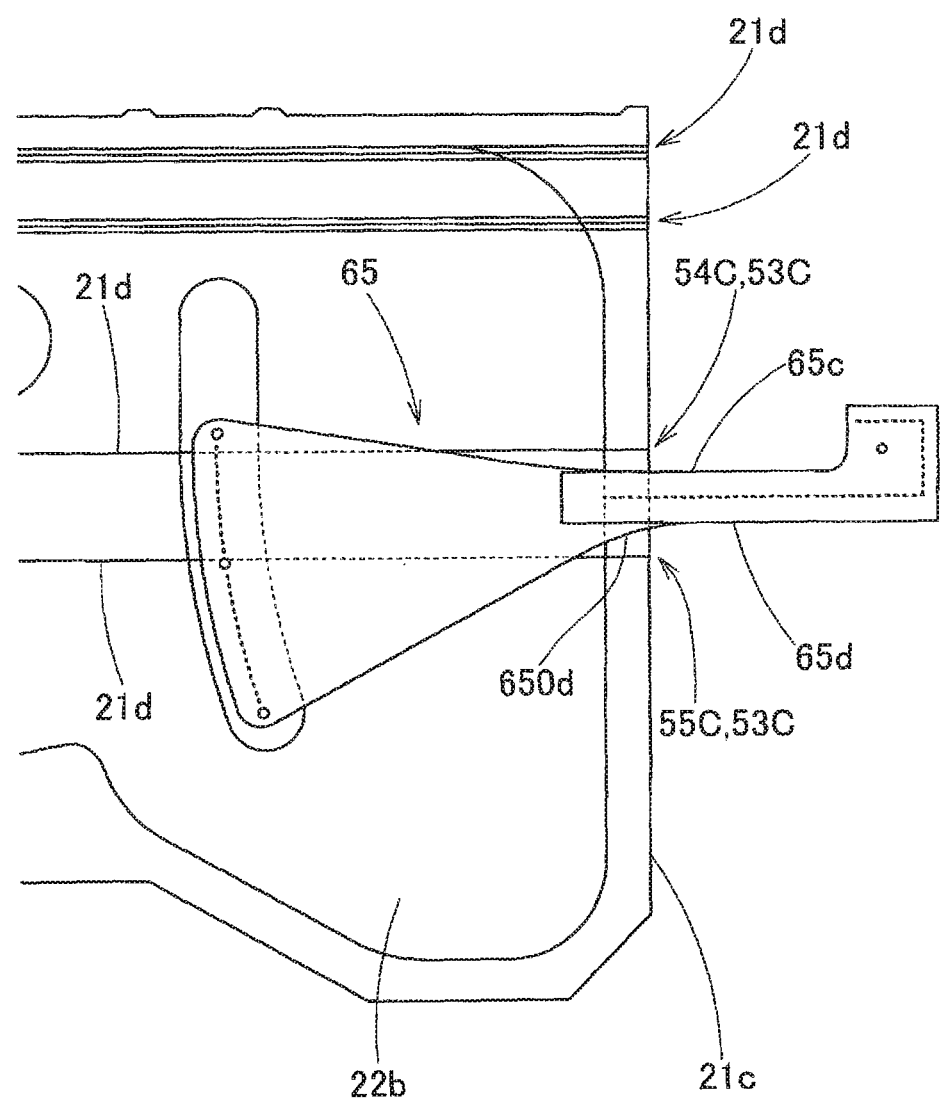
FIG. 18 is a view illustrating of a mark of still another modification of embodiment.

As illustrated in the mark 53C illustrated in FIG. 18, similarly to a weaving yarn. 21d for checking the position of the bellow-folding creases 76a and 76b, the upper mark 54C and the lower mark 55C which are arranged in the vicinity of the upper periphery 65c and the lower peripheries 65d and 650d of the connection belt 65 in the proper arrangement state may be arranged from the colored weaving yarn 21d of double-weaving of the airbag body 21.

Although it is not illustrated in the drawings, as the colored mark to maintain the state of being substantially flush with a surface of the outboard side wall, a mark may be arranged by applying a predetermined color when a coating agent is applied on the surface of the outboard side wall 22b for preventing gas leakage, or by partially applying paint easily recognized in the vicinity of the upper periphery 65c and the lower peripheries 65d and 650d of the connection belt 65 in the proper arrangement state. In the airbag 20 of the embodiment, the upper mark 54 on the upper periphery 65c side of the connection belt 65 and the lower mark 55 on the lower periphery 65d side of the connection belt 65 in the mark 53 are arranged to be separated by the dimensions h1, h2, and h3 of the acceptable arrangement difference from the upper periphery 65c and the lower peripheries 65d and 650d of the connection belt 65 in the proper arrangement state.

For this reason, in the embodiment, if the connection belt 65 is simply arranged between the upper mark 54 and the lower mark 55, it can be checked by an instant visual observation whether the connection belt 65 is in the proper arrangement state within an acceptable error range, and thus the folding operation can be performed further efficiently and smoothly.

Incidentally, the upper marks 54A, 54B, 54C, and 54X and the lower marks 55A, 55B, 55C, and 55X of the mark 53A, 53B, 53C, and 53X illustrated in FIGS. 16 to 18 are arranged to have the acceptable arrangement difference dimension between the upper periphery 65c and the lower peripheries 65d and 650d of the connection belt 65 in the proper arrangement state.

In the airbag 20 of the embodiment, the concave portion 57 which is concave along the front and rear direction is formed in the end periphery 21c of the airbag body 21 which is covered to the connection belt 65 in the proper arrangement state. The upper and lower crossing portions 58 and 59 between the end periphery 21c and the peripheral edge of the concave portion 57 configure the upper mark 54 and the lower mark 55 of the mark 53.

That is, in such a mark 53, the upper and lower crossing portions 58 and 59 between the end periphery 21c and the upper peripheral edge 57a and the lower peripheral edge 57b of the concave portion 57 in the airbag body 21, that is, an upper corner 58a and a lower corner 59a of the peripheral edge of the concave portion 57, particularly, the peripheries thereof on the connection belt 65 side configure the upper mark 54 and the lower mark 55 in the mark 53. It can be instantaneously checked whether the connection belt 65 is in the proper arrangement state by checking an existence of a gap between the upper periphery 65c of the connection belt 65 and the upper corner 58a of the upper mark 54, or an existence of a gap between the lower peripheries 65d and 650d of the connection belt 65 and the lower corner 59a of the lower mark 55, and thus the folding operation can be performed efficiently and smoothly.

In the airbag 20 of the embodiment, in the connection belt 65, a length dimension B2 (see FIG. 4) between the both upper and lower ends of the connection portion 68 which is connected with the airbag body 21 on the base portion 65b side is larger than the vertical end dimension B1 of the portion which covers the end periphery 21c of the airbag body 21. Further, the connection belt 65 is configured such that the width dimension between the upper periphery 65c and the lower periphery 65d is gradually enlarged toward the base portion 65b from B1 to B2. In addition, in the connection portion 68, which is connected with the airbag body 21, of the connection belt 65, a portion connected with the airbag body 21 is not provided with a shorter separation distance than the separation distance L from the connection portion (mounting hole) 66b, which is connected with the peripheral side of the window W1, of the tip 65a of the connection belt 65 to the upper and lower ends 69a and 70b of the connection portion 68 connected with the airbag body 21.

For this reason, in the embodiment, in the connection portion 68, which is connected with the airbag body 21, of the connection belt 65, respective upper end connection point 69a and lower end connection point 70b of the both upper and lower ends have the same separation distance L from the center of the mounting hole 66b of the tip 65a connected with the peripheral edge of the window, or the connection portion 68 is not connected with the airbag body 21 in a portion which has a shorter distance than separation distance L from the center of the mounting hole 66b of the tip 65a. Thus, at the time of completion of inflation of the airbag body 21, the tension T1 is generated in all of the upper peripheries 65c and 650c and the lower peripheries 65d and 650d which are on lines in which each of two connection positions (upper end connection point 69a and lower end connection point 70h) of the both upper and lower ends of the connection portion 68, which is connected the airbag body 21, of the base portion 65b in the connection belt 65 is connected with the connection portion (the center of the mounting hole 66h) of the tip 65a. For this reason, in the airbag 20 of the embodiment, the tension T1 can be generated in a vertically wide area on the base portion 65b side of the connection belt 65. The inflatable portion 38 supported by such a connection belt 65 on the end periphery 21c side of the airbag body 21 is extruded to the inboard side (indoor side) I while the outboard side wall 22h is supported stably. Thus, the head H of the occupant (a driver in the drawings) P which moves obliquely forward (outboard side O) or obliquely rearward can be protected accurately by the inflatable portion 38 on the end periphery 21c side.

Figure 19:
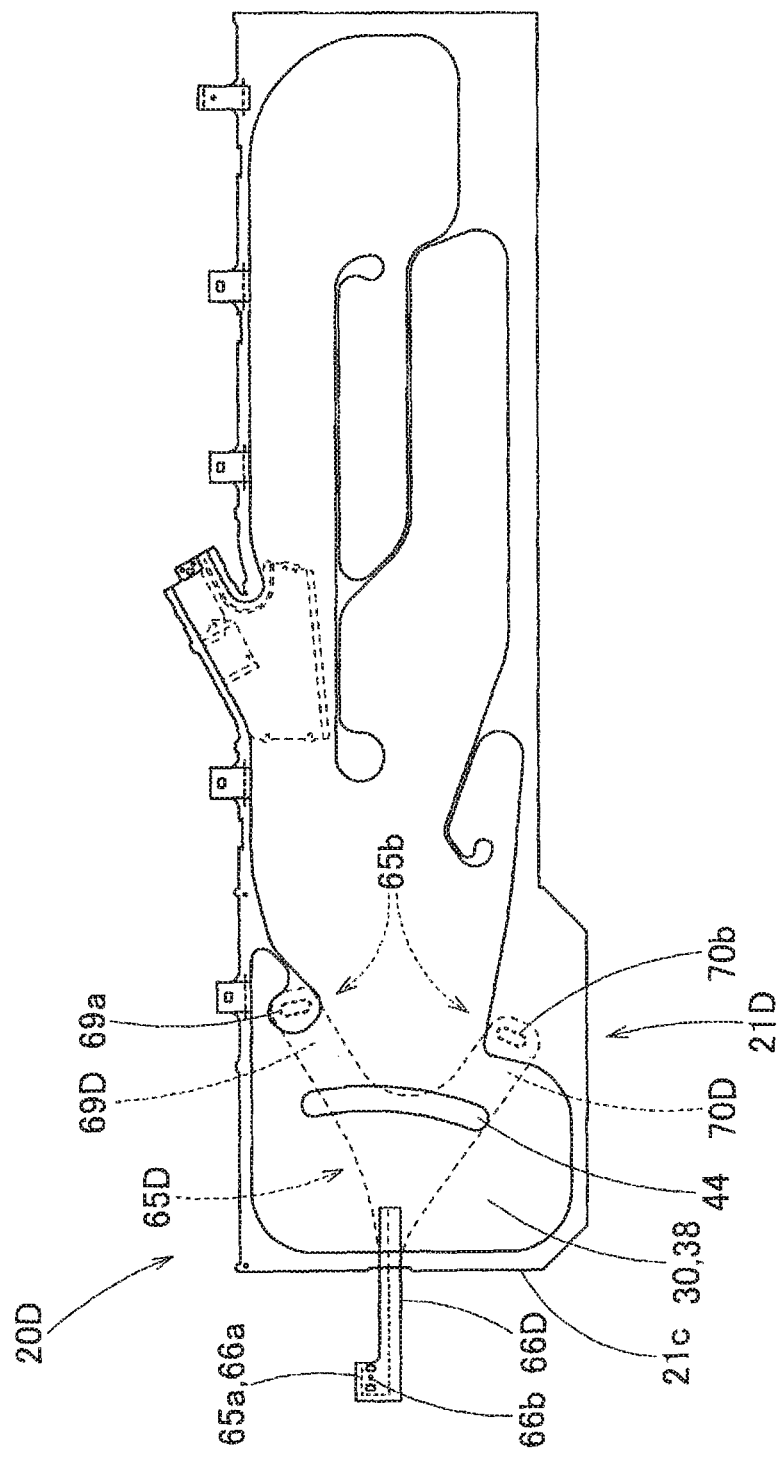
FIG. 19 is a front view illustrating a state where a curtain airbag of still another modification of the embodiment is flatly deployed.
Figure 20:
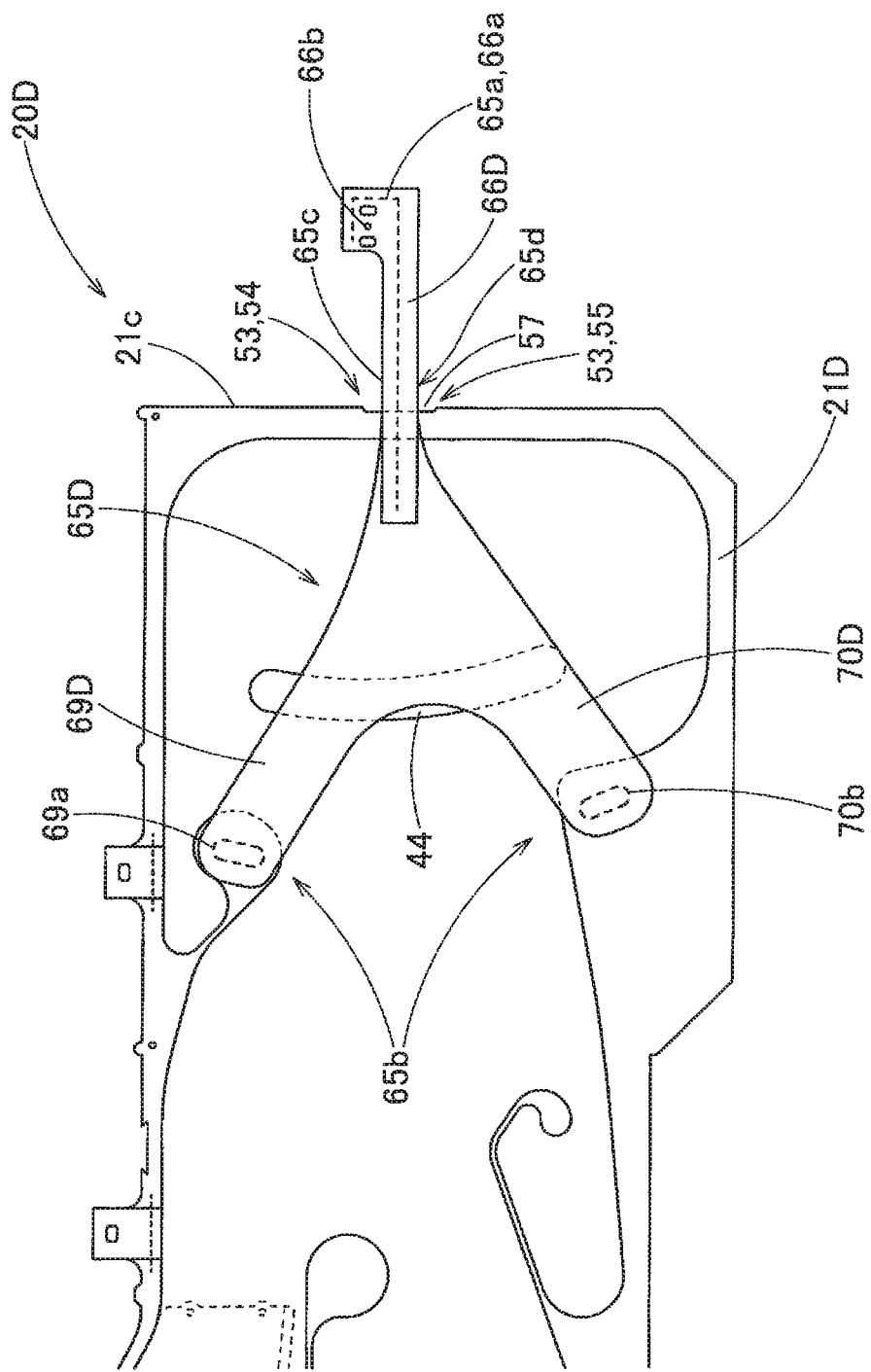
FIG. 20 is a partially enlarged back view of a vicinity of a mark of the curtain airbag illustrated in FIG. 19.

In the airbag 20 of the embodiment, the connection belt 65 includes, on the outboard side O of the end inflatable portion 38, the support portion 71 which covers a substantially triangular-shaped area from the mounting portion 66a to between the upper end connection point 69a and the lower end connection point 70b. Thus, at the time of completion of inflation of the airbag body 21, the outboard side O of the end inflatable portion 38 can be widely supported by the support portion 71 of the connection belt 65, and when the head H of the occupant P is caught by the end inflatable portion 38, a counterforce which is almost even in the wide area can be secured to catch the head H of the occupant P. Incidentally, in consideration of such points, like the connection belt 65D in the airbag 20D illustrated in FIGS. 19 and 20, instead of a triangular plate shaped support portion 71, for example, an almost Y shape may be used which connects a belt portion 66D, which extends in a belt shape rearward from the mounting portion 66a, and a belt-shaped upper portion (upper belt portion) 69D and lower portion (lower belt portion) 70D, which are vertically enlarged from the vicinity of the end periphery 21c of the airbag body 21D in the belt portion 66D to the vicinity of the connection points 69a and 70b of the both upper and lower ends on the base portion 65b side.

At the time of completion of inflation, also in the airbag 20D, a behavior that the inflatable portion 38 of the end periphery (front end) 21c of the airbag body 21D is extruded to the indoor side can be secured by the connection belt 65D which supports the outboard side wall 22b.

Also in the airbag 20D, in the airbag body 21D, the mark 53 configured from the concave portion 57 is disposed in the vicinity of the upper periphery 65c and the lower periphery 65d of the connection belt 65D in the proper arrangement state similarly to the airbag body 21.

As long as the inflatable portion can be extruded to the indoor side although the inflatable portion on the end peripheral side of the airbag body cannot be supported in a wide range, instead of the enlarged portion or the enlarged belt portion, the connection belt may be configured such that the belt body 651 or the main body 650 of the belt portion 66 extends rearward without the vertical width dimension widened, and is connected with the end partition portion 44 by sewing, like the connection belt 65E illustrated by the two-dot chain line of FIG. 17.

In the airbag 20 of the embodiment, in the airbag body 21, the end partition portion 44 which is arranged on the rear side of the end inflatable portion 38 is configured to be curved in an arc shape along the connection portion 68, and a portion (an intermediate portion 38e on a rear periphery 38d side) of the end inflatable portion 38 is arranged between the upper end connection point 69a and the lower end connection point 70b. An inflating area of the end inflatable portion 38 can be secured widely, and the end inflatable portion 38 can be inflated thickly. Incidentally, in consideration of such points, the connection belt may be connected in such a configuration that a portion of the end partition portion on the front peripheral side is formed in an substantially linear shape, and a coupling portion curved in a substantially arc shape is provided in the end partition portion.

Incidentally, in the embodiment, the airbag configured such that the connection belt 65 is arranged the front end of the end periphery 21c of the airbag body 21 is adopted as an example. However, the arrangement position of the connection belt is not limited to the embodiment, and the connection belt may be configured to be arranged in the end periphery of the rear end of the airbag body.

In the embodiment, the folding shape of the airbag 20 is exemplified such that the connection belt 65 is folded together with the airbag body 21 by the outside roll-folding. However, the connection belt 65 may be folded together with the airbag body 21 by the bellow-folding that folds the belt vertically by attaching a plurality of creases along the front and rear direction. Also in such a case, the folding can be performed while it is easily checked by the mark 53 whether the connection belt 65 is arranged in the proper arrangement state.

Incidentally, in the case of the airbag 20 of the embodiment, when the lower periphery 650d of the main body 650 and the linear lower periphery 65d of the belt portion 66 are arranged to have the gaps h2 and h3 between the mark 55, the connection belt 65 is determined to be arranged in the proper arrangement state. However, focusing on that the proper arrangement state is determined when the gap is provided actually by the visual observation, it may be determined only by one side, for example, the lower periphery 650 of the gap dimension h3. Of course, it may be determined only by the linear lower periphery 65d which is easy to see.

What is claimed is:

1. A curtain airbag comprising:
an airbag body which is accommodated in a folded state on an upper peripheral side of a window on an inboard side of a vehicle, and of which an upper periphery is fixedly mounted on a body side of the vehicle to be deployable downward to cover an inboard side of the window when an inflation gas flows in; and
a connection belt which is disposed in an end of the airbag body in a front and rear direction such that a tension is generated in the airbag body at a time of completion of inflation along the front and rear direction, and has a tip connected with a pillar on a peripheral side of the window in the front and rear direction and a base portion connected with the airbag body, wherein:
the connection belt extending from the tip to the base portion as a connection portion connected with the airbag body is configured to be arranged substantially along the front and rear direction so as to cover a portion of an end periphery of the airbag body in the front and rear direction and an inflatable portion of the airbag body on an outboard side wall side of the airbag body in a proper arrangement state of being flatly deployed together with the airbag body before folding; and
a mark for checking the proper arrangement state of the connection belt is arranged to be visually recognized from at least the outboard side wall side in a vicinity of each of an upper periphery and a lower periphery of the connection belt in the proper arrangement state in the airbag body in the state of being flatly deployed before folding.

2. The curtain airbag according to claim 1, wherein the mark is provided by cutting the airbag body, or by coloring to maintain a state of being substantially flush with a surface of the outboard side wall.

3. The curtain airbag according to claim 1, wherein an upper mark on an upper peripheral side of the connection belt and a lower mark on a lower peripheral side of the connection belt in the mark are arranged to be separated by a dimension of an acceptable arrangement difference from the upper periphery and the lower periphery of the connection belt in the proper arrangement state.

4. The curtain airbag according to claim 2, wherein an upper mark on an upper peripheral side of the connection belt and a lower mark on a lower peripheral side of the connection belt in the mark are arranged to be separated by a dimension of an acceptable arrangement difference from the upper periphery and the lower periphery of the connection belt in the proper arrangement state.

5. The curtain airbag according to claim 2, wherein a concave portion which is concave along the front and rear direction is formed in the end periphery of the airbag body which is covered by the connection belt in the proper arrangement state, and
upper and lower crossing portions between the end periphery and the peripheral edge of the concave portion configure the mark.

6. The curtain airbag according to claim 3, wherein
a concave portion which is concave along the front and rear direction is formed in the end periphery of the airbag body which is covered by the connection belt in the proper arrangement state, and
upper and lower crossing portions between the end periphery and the peripheral edge of the concave portion configure the mark.

7. The curtain airbag according to claim 4, wherein
a concave portion which is concave along the front and rear direction is formed in the end periphery of the airbag body which is covered by the connection belt in the proper arrangement state, and
upper and lower crossing portions between the end periphery and the peripheral edge of the concave portion configure the mark.

8. The curtain airbag according to claim 1, wherein
in the connection belt:
  a length dimension between both upper and lower ends of the connection portion, which is connected with the airbag body, of the base portion is larger than a vertical width dimension of a portion which covers the end periphery of the airbag body;
  a width dimension between the upper periphery and the lower periphery is gradually enlarged toward the base portion; and
the connection portion, which is connected with the airbag body, of the connection belt is disposed to have almost the same separation distance from another connection portion, which is connected with a peripheral side of the window, of the tip of the connection belt to the respective upper and lower ends of the connection portion connected with the airbag body, and is disposed not to have a portion connected with the airbag body with a shorter separation distance than the separation distance from the tip of the both upper and lower ends.

* * * * *